United States Patent
Mason

(10) Patent No.: US 9,957,374 B2
(45) Date of Patent: May 1, 2018

(54) COMPOSITIONS CONTAINING AN OXIME-FREE ANTI-SKINNING AGENT, AND METHODS FOR MAKING AND USING THE SAME

(71) Applicant: DURA Chemicals, Inc., Emeryville, CA (US)

(72) Inventor: Andrew Mason, Consett (GB)

(73) Assignee: DURA Chemicals, Inc., Emeryville, CA (US)

( * ) Notice: Subject to any disclaimer, the term of this patent is extended or adjusted under 35 U.S.C. 154(b) by 0 days. days.

(21) Appl. No.: 14/971,509

(22) Filed: Dec. 16, 2015

(65) Prior Publication Data

US 2016/0177056 A1 Jun. 23, 2016

Related U.S. Application Data

(60) Provisional application No. 62/093,229, filed on Dec. 17, 2014.

(51) Int. Cl.
*C08K 5/21* (2006.01)
*C08K 5/36* (2006.01)
*C09D 167/08* (2006.01)

(52) U.S. Cl.
CPC .................. *C08K 5/21* (2013.01); *C08K 5/36* (2013.01); *C09D 167/08* (2013.01)

(58) Field of Classification Search
CPC ........... C08K 5/21; C08K 5/36; C09D 167/08
See application file for complete search history.

(56) References Cited

U.S. PATENT DOCUMENTS

| | | | | |
|---|---|---|---|---|
| 2,371,094 | A * | 3/1945 | Wood | C09D 167/08 |
| | | | | 106/222 |
| 3,598,598 | A * | 8/1971 | Herz | G03C 5/305 |
| | | | | 430/607 |
| 5,162,382 | A * | 11/1992 | Carswell | C08G 18/161 |
| | | | | 428/424.6 |
| 5,199,977 | A | 4/1993 | Yamamori et al. | |
| 5,238,745 | A | 8/1993 | Valet et al. | |
| 6,248,806 | B1 | 6/2001 | Codolar et al. | |
| 6,329,473 | B1 | 12/2001 | Marten et al. | |
| 8,304,022 | B1 | 11/2012 | Kitchens | |
| 2005/0272841 | A1 | 12/2005 | Alford, Jr. et al. | |
| 2006/0207476 | A1 * | 9/2006 | Coward | C09C 1/22 |
| | | | | 106/447 |
| 2007/0022910 | A1 | 2/2007 | Martyak et al. | |
| 2008/0250977 | A1 | 10/2008 | Mason et al. | |
| 2011/0178182 | A1 * | 7/2011 | Gabbai | B82Y 5/00 |
| | | | | 514/770 |
| 2011/0301289 | A1 * | 12/2011 | Amiel | B01J 31/2213 |
| | | | | 524/601 |
| 2012/0165435 | A1 | 6/2012 | Santhanam | |
| 2013/0276672 | A1 * | 10/2013 | Amiel | C09D 5/027 |
| | | | | 106/499 |
| 2013/0331487 | A1 | 12/2013 | Hage et al. | |

OTHER PUBLICATIONS

Anderson, Janis ACTIV-8 Drier Accelerator for Paints and Coatings. Vanderbilt Minerals. Feb. 26, 2013.*

* cited by examiner

*Primary Examiner* — John E Uselding
(74) *Attorney, Agent, or Firm* — Bret E. Field; Bozicevic, Field & Francis LLP

(57) ABSTRACT

Coating compositions containing an oxime-free anti-skinning agent that comprises a urea compound for use as the anti-skinning agent, and methods of making and using the same are provided. Aspects of the disclosure also include methods for preparing and using the coating compositions.

18 Claims, No Drawings

COMPOSITIONS CONTAINING AN OXIME-FREE ANTI-SKINNING AGENT, AND METHODS FOR MAKING AND USING THE SAME

CROSS REFERENCE TO RELATED APPLICATIONS

This application claims priority under 35 U.S.C. § 119(e)(1) to U.S. Provisional Patent Application Ser. No. 62/093,229, filed Dec. 17, 2014, the content of which is incorporated herein by reference in its entirety.

INTRODUCTION

During storage of air-drying coating compositions, such as air-drying paint, a solid film, or skin, may form on the exposed surface. Formation of the skin is undesirable because the skin hinders the use of the coating composition, becomes wasted coating material, and reduces the quality of the remaining composition. The loss of coating material due to skinning is estimated to be as much as 3 to 5%. Thus, reducing skin formation is desired from the perspective of both consumers and manufacturers of air-drying coating compositions.

Methods to reduce skinning include chemical and mechanical approaches. For example, skinning may be prevented or reduced by storing the composition under an inert atmosphere, or physically preventing exposure of the composition to air. However, these approaches are not practical. Alternatively, an anti-skinning compound may be added to the air-drying coating composition to reduce skin formation. Anti-skinning compounds commonly used in alkyd resin-based coating compositions are oxime-containing compounds, which are volatile and toxic. Thus, alternative approaches to reduce skin formation in alkyd resin-based coating compositions are needed.

SUMMARY

Aspects of the present disclosure include a coating composition containing an alkyd resin and an oxime-free anti-skinning agent. In some instances, the oxime-free anti-skinning agent is a urea compound, such as a compound of formula (I):

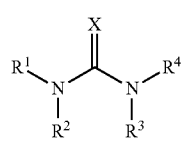

(I)

where X is independently selected from oxygen and sulfur; $R^1$-$R^4$ are independently selected from hydrogen, halo, $C_1$-$C_{24}$ alkyl, $C_2$-$C_{24}$ alkenyl, $C_2$-$C_{24}$ alkynyl, $C_5$-$C_{20}$ aryl, $C_6$-$C_{24}$ alkaryl, $C_6$-$C_{24}$ aralkyl, hydroxyl, $C_1$-$C_{24}$ alkoxy, $C_2$-$C_{24}$ alkenyloxy, $C_2$-$C_{24}$ alkynyloxy, $C_5$-$C_{20}$ aryloxy, acyloxy, acyl, $C_2$-$C_{24}$ alkoxycarbonyl, $C_6$-$C_{20}$ aryloxycarbonyl, $C_2$-$C_{24}$ alkylcarbonyl, $C_6$-$C_{20}$ arylcarbonyl, halocarbonyl, formyl, thioformyl, $C_2$-$C_{24}$ alkylcarbonato, $C_6$-$C_{20}$ arylcarbonato, carboxy, carboxylato, carbamoyl, thiocarbamoyl, carbamato, carbamido, cyano, isocyano, cyanato, isocyanato, isothiocyanato, amino, $C_2$-$C_{24}$ alkylamido, $C_6$-$C_{20}$ arylamido, imino, alkylimino, arylimino, nitro, nitroso, sulfhydryl, $C_1$-$C_{24}$ alkylsulfanyl, $C_5$-$C_{20}$ arylsulfanyl, sulfo, sulfino, sulfonyl, phosphino, phosphono, and O-phosphono, any of which may be unsubstituted or substituted and may contain one or more heteroatoms, and wherein any two adjacent groups selected from $R^1$-$R^4$ may be taken together to form a cycle, wherein such cycle may be aliphatic, aromatic, heteroatom-containing, substituted, or a combination thereof. In certain embodiments, X is sulfur. In certain embodiments, $R^1$-$R^4$ are methyl.

Coating compositions may, in some instances, further include a drier. In certain embodiments, the drier includes a metal carboxylate. In certain embodiments, the metal carboxylate contains a metal selected from the group consisting of Lithium, Sodium, Potassium, Magnesium, Calcium, Strontium, Barium, Titanium, Zirconium, Cerium, Vanadium, Neodymium, Manganese, Rhenium, Iron, Ruthenium, Cobalt, Rhodium, Nickel, Palladium, Platinum, Copper, Silver, Gold, Zinc, Aluminium, Tin, Lead, Bismuth. In certain embodiments, the drier is complexed with a complexing agent. In some embodiments, the complexing agent includes a compound containing nitrogen, oxygen, phosphorous, sulfur, or a combination thereof. In some embodiments, the complexing agent includes a chelating agent. In some embodiments, the chelating agent is selected from 1,10-phenanthroline and 2,2'-bipyridyl.

Other aspects of the present disclosure include a container that includes a coating composition of any of the coating composition embodiments set out above. The container may be made of any convenient material(s), including metals, polymers (e.g., plastics), etc. Further aspects of the present disclosure include a method of forming a coat on a surface of a solid support, the method including applying to a surface of a solid support the coating composition of any of the above coating composition embodiments, thereby forming a coat on the surface of the solid support. In certain embodiments, the coating includes brushing the coating composition onto a surface of a solid support. In some embodiments, the coating includes spraying the coating composition onto a surface of a solid support.

Other aspects of the present disclosure include a composition containing an oxime-free anti-skinning agent, such as a urea compound, e.g., a compound of formula (I):

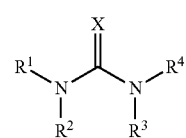

(I)

where X is independently selected from oxygen and sulfur; $R^1$-$R^4$ are independently selected from hydrogen, halo, $C_1$-$C_{24}$ alkyl, $C_2$-$C_{24}$ alkenyl, $C_2$-$C_{24}$ alkynyl, $C_5$-$C_{20}$ aryl, $C_6$-$C_{24}$ alkaryl, $C_6$-$C_{24}$ aralkyl, hydroxyl, $C_1$-$C_{24}$ alkoxy, $C_2$-$C_{24}$ alkenyloxy, $C_2$-$C_{24}$ alkynyloxy, $C_5$-$C_{20}$ aryloxy, acyloxy, acyl, $C_2$-$C_{24}$ alkoxycarbonyl, $C_6$-$C_{20}$ aryloxycarbonyl, $C_2$-$C_{24}$ alkylcarbonyl, $C_6$-$C_{20}$ arylcarbonyl, halocarbonyl, formyl, thioformyl, $C_2$-$C_{24}$ alkylcarbonato, $C_6$-$C_{20}$ arylcarbonato, carboxy, carboxylato, carbamoyl, thiocarbamoyl, carbamato, carbamido, cyano, isocyano, cyanato, isocyanato, isothiocyanato, amino, $C_2$-$C_{24}$ alkylamido, $C_6$-$C_{20}$ arylamido, imino, alkylimino, arylimino, nitro, nitroso, sulfhydryl, $C_1$-$C_{24}$ alkylsulfanyl, $C_5$-$C_{20}$ arylsulfanyl, sulfo, sulfino, sulfonyl, phosphino, phosphono, and O-phosphono, any of which may be unsubstituted or substituted and may contain one or more heteroatoms, and wherein any two adjacent groups selected from $R^1$-$R^4$ may be taken together to form a cycle, wherein such cycle may be aliphatic, aromatic, heteroatom-containing, substituted, or a combination thereof, and a drier. In certain embodiments, X is sulfur. In certain embodiments, $R^1$-$R^4$ are methyl, ethyl, propyl, butyl, pentyl, hexyl, heptyl, and/or octyl. In certain embodiments, the drier includes a metal carboxylate. In certain embodiments, the metal carboxylate contains a metal selected from the group consisting of lithium, sodium, potassium, magnesium, calcium, strontium, Barium, Titanium, Zirconium, Cerium, Vanadium, Neodymium, Manganese, Rhenium, Iron, Ruthenium, Cobalt, Rhodium, Nickel, Palladium, Platinum, Copper, Silver, Gold, Zinc, Aluminium, Tin, Lead, Bismuth. In certain embodiments, the drier is complexed with a complexing agent. In some embodiments, the complexing agent includes a compound containing nitrogen, oxygen, phosphorous, sulfur, or a combination thereof. In some embodiments, the complexing agent includes a chelating agent. Chelating agents of interest include straight chain amines of primary, secondary and tertiary nature, and combinations thereof, of any total length and any number of carbons between each nitrogen, as desired. Cyclic amines of secondary and tertiary nature and combinations thereof of any total length and any number of carbons between each nitrogen are also of interest, where in certain instances such agents may have eight nitrogens or less, and in some instances 22 C and N or less in length. Cryptands and crown ethers, in some instances up a maximum of 8 oxygen or oxygen and nitrogen may also be employed. Also of interest are calixarenes. Also of interest are combinations of the aforementioned. In some embodiments, the chelating agent is selected from 1,10-phenanthroline and 2,2'-bipyridyl.

Aspects of the present disclosure include methods of preparing a coating composition, e.g., as described above. In certain embodiments, the method includes combining an alkyd resin and an anti-skinning composition that includes an oxime-free anti-skinning agent, e.g., a urea compound such as a compound of formula (I)

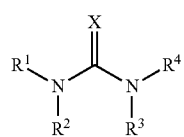

(I)

where X is independently selected from oxygen and sulfur; $R^1$-$R^4$ are independently selected from hydrogen, halo, $C_1$-$C_{24}$ alkyl, $C_2$-$C_{24}$ alkenyl, $C_2$-$C_{24}$ alkynyl, $C_5$-$C_{20}$ aryl, $C_6$-$C_{24}$ alkaryl, $C_6$-$C_{24}$ aralkyl, hydroxyl, $C_1$-$C_{24}$ alkoxy, $C_2$-$C_{24}$ alkenyloxy, $C_2$-$C_{24}$ alkynyloxy, $C_5$-$C_{20}$ aryloxy, acyloxy, acyl, $C_2$-$C_{24}$ alkoxycarbonyl, $C_6$-$C_{20}$ aryloxycarbonyl, $C_2$-$C_{24}$ alkylcarbonyl, $C_6$-$C_{20}$ arylcarbonyl, halocarbonyl, formyl, thioformyl, $C_2$-$C_{24}$ alkylcarbonato, $C_6$-$C_{20}$ arylcarbonato, carboxy, carboxylato, carbamoyl, thiocarbamoyl, carbamato, carbamido, cyano, isocyano, cyanato, isocyanato, isothiocyanato, amino, $C_2$-$C_{24}$ alkylamido, $C_6$-$C_{20}$ arylamido, imino, alkylimino, arylimino, nitro, nitroso, sulfhydryl, $C_1$-$C_{24}$ alkylsulfanyl, $C_5$-$C_{20}$ arylsulfanyl, sulfo, sulfino, sulfonyl, phosphino, phosphono, and O-phosphono, any of which may be unsubstituted or substituted and may contain one or more heteroatoms, and wherein any two adjacent groups selected from $R^1$-$R^4$ may be taken together to form a cycle, wherein such cycle may be aliphatic, aromatic, heteroatom-containing, substituted, or a combination thereof, under conditions sufficient to produce a coating composition. In certain embodiments, X is sulfur. In certain embodiments, $R^1$-$R^4$ are methyl.

In methods of preparing a coating composition, e.g., as described above, the method may include combining the anti-skinning agent and a drier, thereby forming an anti-skinning composition. In certain embodiments, the drier includes a metal carboxylate. In certain embodiments, the metal carboxylate contains a metal selected from the group consisting of Lithium, Sodium, Potassium, Magnesium, Calcium, Strontium, Barium, Titanium, Zirconium, Cerium, Vanadium, Neodymium, Manganese, Rhenium, Iron, Ruthenium, Cobalt, Rhodium, Nickel, Palladium, Platinum, Copper, Silver, Gold, Zinc, Aluminium, Tin, Lead, Bismuth. In certain embodiments, the drier is complexed with a complexing agent. In some embodiments, the complexing agent includes a compound containing nitrogen, oxygen, phosphorous, sulfur, or a combination thereof. In some embodiments, the complexing agent includes a chelating agent. In some embodiments, the chelating agent is selected from 1,10-phenanthroline and 2,2'-bipyridyl.

DEFINITIONS

The nomenclature of certain compounds or substituents are used in their conventional sense, such as described in chemistry literature including but not limited to Loudon, Organic Chemistry, Fourth Edition, New York: Oxford University Press, 2002, pp. 360-361, 1084-1085; Smith and March, March's Advanced Organic Chemistry: Reactions, Mechanisms, and Structure, Fifth Edition, Wiley-Interscience, 2001.

As used herein, the term "alkyl" by itself or as part of another substituent refers to a saturated branched or straight-chain monovalent hydrocarbon radical derived by the removal of one hydrogen atom from a single carbon atom of a parent alkane. Typical alkyl groups include, but are not limited to, methyl; ethyl, propyls such as propan-1-yl or propan-2-yl; and butyls such as butan-1-yl, butan-2-yl, 2-methyl-propan-1-yl or 2-methyl-propan-2-yl. In some embodiments, an alkyl group comprises from 1 to 20 carbon atoms. In other embodiments, an alkyl group comprises from 1 to 10 carbon atoms. In still other embodiments, an alkyl group comprises from 1 to 6 carbon atoms, such as from 1 to 4 carbon atoms.

"Alkanyl" by itself or as part of another substituent refers to a saturated branched, straight-chain or cyclic alkyl radical derived by the removal of one hydrogen atom from a single carbon atom of an alkane. Typical alkanyl groups include, but are not limited to, methanyl; ethanyl; propanyls such as propan-1-yl, propan-2-yl (isopropyl), cyclopropan-1-yl, etc.; butanyls such as butan-1-yl, butan-2-yl (sec-butyl), 2-methyl-propan-1-yl (isobutyl), 2-methyl-propan-2-yl (t-butyl), cyclobutan-1-yl, etc.; and the like.

"Alkylene" refers to a branched or unbranched saturated hydrocarbon chain, usually having from 1 to 40 carbon atoms, more usually 1 to 10 carbon atoms and even more usually 1 to 6 carbon atoms. This term is exemplified by groups such as methylene (—$CH_2$—), ethylene (—$CH_2CH_2$—), the propylene isomers (e.g., —$CH_2CH_2CH_2$— and —$CH(CH_3)CH_2$—) and the like.

"Alkenyl" by itself or as part of another substituent refers to an unsaturated branched, straight-chain or cyclic alkyl radical having at least one carbon-carbon double bond derived by the removal of one hydrogen atom from a single carbon atom of an alkene. The group may be in either the cis or trans conformation about the double bond(s). Typical alkenyl groups include, but are not limited to, ethenyl;

propenyls such as prop-1-en-1-yl, prop-1-en-2-yl, prop-2-en-1-yl (allyl), prop-2-en-2-yl, cycloprop-1-en-1-yl; cycloprop-2-en-1-yl; butenyls such as but-1-en-1-yl, but-1-en-2-yl, 2-methyl-prop-1-en-1-yl, but-2-en-1-yl, but-2-en-2-yl, but-2-en-2-yl, buta-1,3-dien-1-yl, buta-1,3-dien-2-yl, cyclobut-1-en-1-yl, cyclobut-1-en-3-yl, cyclobuta-1,3-dien-1-yl, etc.; and the like.

"Alkynyl" by itself or as part of another substituent refers to an unsaturated branched, straight-chain or cyclic alkyl radical having at least one carbon-carbon triple bond derived by the removal of one hydrogen atom from a single carbon atom of an alkyne. Typical alkynyl groups include, but are not limited to, ethynyl; propynyls such as prop-1-yn-1-yl, prop-2-yn-1-yl, etc.; butynyls such as but-1-yn-1-yl, but-1-yn-3-yl, but-3-yn-1-yl, etc.; and the like.

"Acyl" by itself or as part of another substituent refers to a radical —C(O)$R^{30}$, where $R^{30}$ is hydrogen, alkyl, cycloalkyl, cycloheteroalkyl, aryl, arylalkyl, heteroalkyl, heteroaryl, heteroarylalkyl as defined herein and substituted versions thereof. Representative examples include, but are not limited to formyl, acetyl, cyclohexylcarbonyl, cyclohexylmethylcarbonyl, benzoyl, benzylcarbonyl, piperonyl, succinyl, and malonyl, and the like.

The term "aminoacyl" refers to the group —C(O)$NR^{21}R^{22}$, wherein $R^{21}$ and $R^{22}$ independently are selected from the group consisting of hydrogen, alkyl, substituted alkyl, alkenyl, substituted alkenyl, alkynyl, substituted alkynyl, aryl, substituted aryl, cycloalkyl, substituted cycloalkyl, cycloalkenyl, substituted cycloalkenyl, heteroaryl, substituted heteroaryl, heterocyclic, and substituted heterocyclic and where $R^{21}$ and $R^{22}$ are optionally joined together with the nitrogen bound thereto to form a heterocyclic or substituted heterocyclic group, and wherein alkyl, substituted alkyl, alkenyl, substituted alkenyl, alkynyl, substituted alkynyl, cycloalkyl, substituted cycloalkyl, cycloalkenyl, substituted cycloalkenyl, aryl, substituted aryl, heteroaryl, substituted heteroaryl, heterocyclic, and substituted heterocyclic are as defined herein.

"Alkoxy" by itself or as part of another substituent refers to a radical —$OR^{31}$ where $R^{31}$ represents an alkyl or cycloalkyl group as defined herein. Representative examples include, but are not limited to, methoxy, ethoxy, propoxy, butoxy, cyclohexyloxy and the like.

"Alkoxycarbonyl" by itself or as part of another substituent refers to a radical —C(O)$OR^{31}$ where $R^{31}$ represents an alkyl or cycloalkyl group as defined herein. Representative examples include, but are not limited to, methoxycarbonyl, ethoxycarbonyl, propoxycarbonyl, butoxycarbonyl, cyclohexyloxycarbonyl and the like.

"Aryl" by itself or as part of another substituent refers to a monovalent aromatic hydrocarbon radical derived by the removal of one hydrogen atom from a single carbon atom of an aromatic ring system. Typical aryl groups include, but are not limited to, groups derived from aceanthrylene, acenaphthylene, acephenanthrylene, anthracene, azulene, benzene, chrysene, coronene, fluoranthene, fluorene, hexacene, hexaphene, hexalene, as-indacene, s-indacene, indane, indene, naphthalene, octacene, octaphene, octalene, ovalene, penta-2,4-diene, pentacene, pentalene, pentaphene, perylene, phenalene, phenanthrene, picene, pleiadene, pyrene, pyranthrene, rubicene, triphenylene, trinaphthalene and the like. In certain embodiments, an aryl group comprises from 6 to 20 carbon atoms. In certain embodiments, an aryl group comprises from 6 to 12 carbon atoms. Examples of an aryl group are phenyl and naphthyl.

"Arylalkyl" by itself or as part of another substituent refers to an acyclic alkyl radical in which one of the hydrogen atoms bonded to a carbon atom, typically a terminal or sp$^3$ carbon atom, is replaced with an aryl group. Typical arylalkyl groups include, but are not limited to, benzyl, 2-phenylethan-1-yl, 2-phenylethen-1-yl, naphthylmethyl, 2-naphthylethan-1-yl, 2-naphthylethen-1-yl, naphthobenzyl, 2-naphthophenylethan-1-yl and the like. Where specific alkyl moieties are intended, the nomenclature arylalkanyl, arylalkenyl and/or arylalkynyl is used. In certain embodiments, an arylalkyl group is ($C_7$-$C_{30}$) arylalkyl, e.g., the alkanyl, alkenyl or alkynyl moiety of the arylalkyl group is ($C_1$-$C_{10}$) and the aryl moiety is ($C_6$-$C_{20}$). In certain embodiments, an arylalkyl group is ($C_7$-$C_{20}$) arylalkyl, e.g., the alkanyl, alkenyl or alkynyl moiety of the arylalkyl group is ($C_1$-$C_8$) and the aryl moiety is ($C_6$-$C_{12}$).

"Arylaryl" by itself or as part of another substituent, refers to a monovalent hydrocarbon group derived by the removal of one hydrogen atom from a single carbon atom of a ring system in which two or more identical or non-identical aromatic ring systems are joined directly together by a single bond, where the number of such direct ring junctions is one less than the number of aromatic ring systems involved. Typical arylaryl groups include, but are not limited to, biphenyl, triphenyl, phenyl-napthyl, binaphthyl, biphenyl-napthyl, and the like. When the number of carbon atoms in an arylaryl group are specified, the numbers refer to the carbon atoms comprising each aromatic ring. For example, ($C_5$-$C_{14}$) arylaryl is an arylaryl group in which each aromatic ring comprises from 5 to 14 carbons, e.g., biphenyl, triphenyl, binaphthyl, phenylnapthyl, etc. In certain embodiments, each aromatic ring system of an arylaryl group is independently a ($C_5$-$C_{14}$) aromatic. In certain embodiments, each aromatic ring system of an arylaryl group is independently a ($C_5$-$C_{10}$) aromatic. In certain embodiments, each aromatic ring system is identical, e.g., biphenyl, triphenyl, binaphthyl, trinaphthyl, etc.

"Cycloalkyl" by itself or as part of another substituent refers to a saturated or unsaturated cyclic alkyl radical. Where a specific level of saturation is intended, the nomenclature "cycloalkanyl" or "cycloalkenyl" is used. Typical cycloalkyl groups include, but are not limited to, groups derived from cyclopropane, cyclobutane, cyclopentane, cyclohexane and the like. In certain embodiments, the cycloalkyl group is ($C_3$-$C_{10}$) cycloalkyl. In certain embodiments, the cycloalkyl group is ($C_3$-$C_7$) cycloalkyl.

"Cycloheteroalkyl" or "heterocyclyl" by itself or as part of another substituent, refers to a saturated or unsaturated cyclic alkyl radical in which one or more carbon atoms (and any associated hydrogen atoms) are independently replaced with the same or different heteroatom. Typical heteroatoms to replace the carbon atom(s) include, but are not limited to, N, P, O, S, Si, etc. Where a specific level of saturation is intended, the nomenclature "cycloheteroalkanyl" or "cycloheteroalkenyl" is used. Typical cycloheteroalkyl groups include, but are not limited to, groups derived from epoxides, azirines, thiiranes, imidazolidine, morpholine, piperazine, piperidine, pyrazolidine, pyrrolidine, quinuclidine and the like.

"Heteroalkyl, Heteroalkanyl, Heteroalkenyl and Heteroalkynyl" by themselves or as part of another substituent refer to alkyl, alkanyl, alkenyl and alkynyl groups, respectively, in which one or more of the carbon atoms (and any associated hydrogen atoms) are independently replaced with the same or different heteroatomic groups. Typical heteroatomic groups which can be included in these groups include, but are not limited to, —O—, —S—, —S—S—, —O—S—, —$NR^{37}R^{38}$—, =N—N=, —N=N—, —N=N—$NR^{39}R^{40}$, —$PR^{41}$—, —P(O)$_2$—, —$POR^{42}$—, —O—P(O)$_2$—, —S—O—, —S—(O)—, —SO$_2$—, —SnR$^{43}$R$^{44}$— and the like, where R$^{37}$, R$^{38}$, R$^{39}$, R$^{40}$, R$^{41}$, R$^{42}$, R$^{43}$ and R$^{44}$ are independently hydrogen, alkyl, substituted alkyl, aryl, substituted aryl, arylalkyl, substituted arylalkyl, cycloalkyl, substituted cycloalkyl, cycloheteroalkyl, substituted cycloheteroalkyl, heteroalkyl, substituted heteroalkyl, heteroaryl, substituted heteroaryl, heteroarylalkyl or substituted heteroarylalkyl.

"Heteroaryl" by itself or as part of another substituent, refers to a monovalent heteroaromatic radical derived by the removal of one hydrogen atom from a single atom of a heteroaromatic ring system. Typical heteroaryl groups include, but are not limited to, groups derived from acridine, arsindole, carbazole, β-carboline, chromane, chromene, cinnoline, furan, imidazole, indazole, indole, indoline, indolizine, isobenzofuran, isochromene, isoindole, isoindoline, isoquinoline, isothiazole, isoxazole, naphthyridine, oxadiazole, oxazole, perimidine, phenanthridine, phenanthroline, phenazine, phthalazine, pteridine, purine, pyran, pyrazine, pyrazole, pyridazine, pyridine, pyrimidine, pyrrole, pyrrolizine, quinazoline, quinoline, quinolizine, quinoxaline, tetrazole, thiadiazole, thiazole, thiophene, triazole, xanthene, benzodioxole and the like. In certain embodiments, the heteroaryl group is from 5-20 membered heteroaryl. In certain embodiments, the heteroaryl group is from 5-10 membered heteroaryl. In certain embodiments, heteroaryl groups are those derived from thiophene, pyrrole, benzothiophene, benzofuran, indole, pyridine, quinoline, imidazole, oxazole and pyrazine.

"Heteroarylalkyl" by itself or as part of another substituent, refers to an acyclic alkyl radical in which one of the hydrogen atoms bonded to a carbon atom, typically a terminal or sp$^3$ carbon atom, is replaced with a heteroaryl group. Where specific alkyl moieties are intended, the nomenclature heteroarylalkanyl, heteroarylalkenyl and/or heterorylalkynyl is used. In certain embodiments, the heteroarylalkyl group is a 6-30 membered heteroarylalkyl, e.g., the alkanyl, alkenyl or alkynyl moiety of the heteroarylalkyl is 1-10 membered and the heteroaryl moiety is a 5-20-membered heteroaryl. In certain embodiments, the heteroarylalkyl group is 6-20 membered heteroarylalkyl, e.g., the alkanyl, alkenyl or alkynyl moiety of the heteroarylalkyl is 1-8 membered and the heteroaryl moiety is a 5-12-membered heteroaryl.

"Aromatic Ring System" by itself or as part of another substituent, refers to an unsaturated cyclic or polycyclic ring system having a conjugated Ti electron system. Specifically included within the definition of "aromatic ring system" are fused ring systems in which one or more of the rings are aromatic and one or more of the rings are saturated or unsaturated, such as, for example, fluorene, indane, indene, phenalene, etc. Typical aromatic ring systems include, but are not limited to, aceanthrylene, acenaphthylene, acephenanthrylene, anthracene, azulene, benzene, chrysene, coronene, fluoranthene, fluorene, hexacene, hexaphene, hexalene, as-indacene, s-indacene, indane, indene, naphthalene, octacene, octaphene, octalene, ovalene, penta-2,4-diene, pentacene, pentalene, pentaphene, perylene, phenalene, phenanthrene, picene, pleiadene, pyrene, pyranthrene, rubicene, triphenylene, trinaphthalene and the like.

"Heteroaromatic Ring System" by itself or as part of another substituent, refers to an aromatic ring system in which one or more carbon atoms (and any associated hydrogen atoms) are independently replaced with the same or different heteroatom. Typical heteroatoms to replace the carbon atoms include, but are not limited to, N, P, O, S, Si, etc. Specifically included within the definition of "heteroaromatic ring systems" are fused ring systems in which one or more of the rings are aromatic and one or more of the rings are saturated or unsaturated, such as, for example, arsindole, benzodioxan, benzofuran, chromane, chromene, indole, indoline, xanthene, etc. Typical heteroaromatic ring systems include, but are not limited to, arsindole, carbazole, β-carboline, chromane, chromene, cinnoline, furan, imidazole, indazole, indole, indoline, indolizine, isobenzofuran, isochromene, isoindole, isoindoline, isoquinoline, isothiazole, isoxazole, naphthyridine, oxadiazole, oxazole, perimidine, phenanthridine, phenanthroline, phenazine, phthalazine, pteridine, purine, pyran, pyrazine, pyrazole, pyridazine, pyridine, pyrimidine, pyrrole, pyrrolizine, quinazoline, quinoline, quinolizine, quinoxaline, tetrazole, thiadiazole, thiazole, thiophene, triazole, xanthene and the like.

"Substituted" refers to a group in which one or more hydrogen atoms are independently replaced with the same or different substituent(s). Typical substituents include, but are not limited to, alkylenedioxy (such as methylenedioxy), -M, —R$^{60}$, —O$^-$, =O, —OR$^{60}$, —SR$^{60}$, —S$^-$, =S, —NR$^{60}$R$^{61}$, =NR$^{60}$, —CF$_3$, —CN, —OCN, —SCN, —NO, —NO$_2$, =N$_2$, —N$_3$, —S(O)$_2$O$^-$, —S(O)$_2$OH, —S(O)$_2$R$^{60}$, —OS(O)$_2$O$^-$, —OS(O)$_2$R$^{60}$, —P(O)(O$^-$)$_2$, —P(O)(OR$^{60}$)(O$^-$), —OP(O)(OR$^{60}$)(OR$^{61}$), —C(O)R$^{60}$, —C(S)R$^{60}$, —C(O)OR$^{60}$, —C(O)NR$^{60}$R$^{61}$, —C(O)O$^-$, —C(S)OR$^{60}$, —NR$^{62}$C(O)NR$^{60}$R$^{61}$, —NR$^{62}$C(S)NR$^{60}$R$^{61}$, —NR$^{62}$C(NR$^{63}$)NR$^{60}$R$^{61}$ and —C(NR$^{62}$)NR$^{60}$R$^{61}$, where M is halogen; R$^{60}$, R$^{61}$, R$^{62}$ and R$^{63}$ are independently hydrogen, alkyl, substituted alkyl, alkoxy, substituted alkoxy, cycloalkyl, substituted cycloalkyl, cycloheteroalkyl, substituted cycloheteroalkyl, aryl, substituted aryl, heteroaryl or substituted heteroaryl, or optionally R$^{60}$ and R$^{61}$ together with the nitrogen atom to which they are bonded form a cycloheteroalkyl or substituted cycloheteroalkyl ring; and R$^{64}$ and R$^{65}$ are independently hydrogen, alkyl, substituted alkyl, aryl, cycloalkyl, substituted cycloalkyl, cycloheteroalkyl, substituted cycloheteroalkyl, aryl, substituted aryl, heteroaryl or substituted heteroaryl, or optionally R$^{64}$ and R$^{65}$ together with the nitrogen atom to which they are bonded form a cycloheteroalkyl or substituted cycloheteroalkyl ring. In certain embodiments, substituents include -M, —R$^{60}$, =O, —OR$^{60}$, —SR$^{60}$, —S$^-$, =S, —NR$^{60}$R$^{61}$, =NR$^{60}$, —CF$_3$, —CN, —OCN, —SCN, —NO, —NO$_2$, =N$_2$, —N$_3$, —S(O)$_2$R$^{60}$, —OS(O)$_2$O$^-$, —OS(O)$_2$R$^{60}$, —P(O)(O$^-$)$_2$, —P(O)(OR$^{60}$)(O$^-$), —OP(O)(OR$^{60}$)(OR$^{61}$), —C(O)R$^{61}$, —C(S)R$^{60}$, —C(O)OR$^{60}$, —C(O)NR$^{60}$R$^{61}$, —C(O)O$^-$, —NR$^{62}$C(O)NR$^{60}$R$^{61}$. In certain embodiments, substituents include -M, —R$^{60}$, =O, —OR$^{60}$, —SR$^{60}$, —NR$^{60}$R$^{61}$, —CF$_3$, —CN, —NO$_2$, —S(O)$_2$R$^{60}$, —P(O)(OR$^{60}$)(O$^-$), —OP(O)(OR$^{60}$)(OR$^{61}$), —C(O)R$^{60}$, —C(O)OR$^{60}$, —C(O)NR$^{60}$R$^{61}$, —C(O)O$^-$. In certain embodiments, substituents include -M, —R$^{60}$, =O, —OR$^{60}$, —SR$^{60}$, —NR$^{60}$R$^{61}$, —CF$_3$, —CN, —NO$_2$, —S(O)$_2$R$^{60}$, —OP(O)(OR$^{60}$)(OR$^{61}$), —C(O)R$^{60}$, —C(O)OR$^{60}$, —C(O)O$^-$, where R$^{60}$, R$^{61}$ and R$^{62}$ are as defined above. For example, a substituted group may bear a methylenedioxy substituent or one, two, or three substituents selected from a halogen atom, a (1-4C)alkyl group and a (1-4C)alkoxy group.

The compounds described herein can contain one or more chiral centers and/or double bonds and therefore, can exist as stereoisomers, such as double-bond isomers (i.e., geometric isomers), enantiomers or diastereomers. Accordingly, all possible enantiomers and stereoisomers of the compounds including the stereoisomerically pure form (e.g., geometrically pure, enantiomerically pure or diastereomerically pure) and enantiomeric and stereoisomeric mixtures are included in the description of the compounds herein.

Enantiomeric and stereoisomeric mixtures can be resolved into their component enantiomers or stereoisomers using separation techniques or chiral synthesis techniques well known to the skilled artisan. The compounds can also exist in several tautomeric forms including the enol form, the keto form and mixtures thereof. Accordingly, the chemical structures depicted herein encompass all possible tautomeric forms of the illustrated compounds. The compounds described also include isotopically labeled compounds where one or more atoms have an atomic mass different from the atomic mass conventionally found in nature. Examples of isotopes that can be incorporated into the compounds disclosed herein include, but are not limited to, $^2H$, $^3H$, $^{11}C$, $^{13}C$, $^{14}C$, $^{15}N$, $^{18}O$, $^{17}O$, etc. Compounds can exist in unsolvated forms as well as solvated forms, including hydrated forms. In general, compounds can be hydrated or solvated. Certain compounds can exist in multiple crystalline or amorphous forms. In general, all physical forms are equivalent for the uses contemplated herein and are intended to be within the scope of the present disclosure.

An "oxime" as used herein refers to a chemical compound having the general formula: $R^1R^2C=NOH$, where $R^1$ and $R^2$ are independently selected from hydrogen, halo, $C_1$-$C_{24}$ alkyl, $C_2$-$C_{24}$ alkenyl, $C_2$-$C_{24}$ alkynyl, $C_5$-$C_{20}$ aryl, $C_6$-$C_{24}$ alkaryl, $C_1$-$C_{24}$ aralkyl, hydroxyl, $C_1$-$C_{24}$ alkoxy, $C_2$-$C_{24}$ alkenyloxy, $C_2$-$C_{24}$ alkynyloxy, $C_5$-$C_{20}$ aryloxy, acyloxy, acyl, $C_2$-$C_{24}$ alkoxycarbonyl, $C_6$-$C_{20}$ aryloxycarbonyl, $C_2$-$C_{24}$ alkylcarbonyl, $C_6$-$C_{20}$ arylcarbonyl, halocarbonyl, formyl, thioformyl, $C_2$-$C_{24}$ alkylcarbonato, $C_6$-$C_{20}$ arylcarbonato, carboxy, carboxylato, carbamoyl, thiocarbamoyl, carbamato, carbamido, cyano, isocyano, cyanato, isocyanato, isothiocyanato, amino, $C_2$-$C_{24}$ alkylamido, $C_6$-$C_{20}$ arylamido, imino, alkylimino, arylimino, nitro, nitroso, sulfhydryl, $C_1$-$C_{24}$ alkylsulfanyl, $C_5$-$C_{20}$ arylsulfanyl, sulfo, sulfino, sulfonyl, phosphino, phosphono, and O-phosphono, any of which may be unsubstituted or substituted and may contain one or more heteroatoms. Examples of oxime compounds include, but are not limited to, methyl ethyl ketoxime (MEKO), butyl aldoxime, and cyclohexanone oxime.

DETAILED DESCRIPTION

Provided herein are compositions containing an anti-skinning agent, and methods of making and using the same. Aspects of the present disclosure include an oxime-free anti-skinning agent, e.g., a urea compound, such as describe above and in greater detail below. The subject compositions containing an anti-skinning agent may be an air-drying coating composition, e.g., an alkyd resin-based coating composition, or may be an additive for an air-drying coating composition. Also provided herein are methods of preparing an alkyd resin-based coating composition containing an anti-skinning agent, and methods of using the same.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating un-recited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a," "an" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

The anti-skinning agents are described first in greater detail below, followed by description of compositions containing the anti-skinning agents. Methods of preparation and use of the compositions are also provided.

Anti-Skinning Agent

As summarized above, aspects of the present disclosure include an anti-skinning agent, i.e., compounds that reduce skinning in an air-drying coating composition, such as an alkyd resin-based paint, during manufacturing and/or storage. "Skinning," as used herein, refers to the formation of a solid film, or skin, on the exposed surface of an air-drying coating composition, such as paint or varnish, stored in open or closed containers. Thus, an anti-skinning agent present in sufficient amounts in an air-drying coating composition inhibits skin formation, or reduces the rate at which a skin forms on the air-exposed surface of the coating composition relative to a comparable air-drying coating composition that does not contain the anti-skinning agent. The anti-skinning activity of the anti-skinning agent may be measured using a suitable method, such as storing under a suitable storage condition, a first coating composition with the anti-skinning agent and a second coating composition without the anti-skinning agent, determining the time it takes for the coating compositions to display skinning, i.e. form a skin on the air-exposed surface of the composition, and comparing the time between the first and second compositions.

Aspects of the present disclosure include an oxime-free anti-skinning agent. By oxime-free anti-skinning agent is meant an anti-skinning agent that does not include an oxime. In some instances, the oxime-free anti-skinning agent is a urea compound, by which is meant urea or derivative thereof. Urea compounds of interest include, but are not limited to, urea compounds of formula (I):

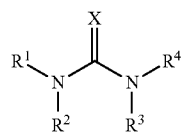

(I)

where X is independently selected from oxygen and sulfur; $R^1$-$R^4$ are independently selected from hydrogen, halo, $C_1$-$C_{24}$ alkyl, $C_2$-$C_{24}$ alkenyl, $C_2$-$C_{24}$ alkynyl, $C_5$-$C_{20}$ aryl, $C_6$-$C_{24}$ alkaryl, $C_6$-$C_{24}$ aralkyl, hydroxyl, $C_1$-$C_{24}$ alkoxy, $C_2$-$C_{24}$ alkenyloxy, $C_2$-$C_{24}$ alkynyloxy, $C_5$-$C_{20}$ aryloxy, acyloxy, acyl, $C_2$-$C_{24}$ alkoxycarbonyl, $C_6$-$C_{20}$ aryloxycarbonyl, $C_2$-$C_{24}$ alkylcarbonyl, $C_6$-$C_{20}$ arylcarbonyl, halocarbonyl, formyl, thioformyl, $C_2$-$C_{24}$ alkylcarbonato, $C_6$-$C_{20}$ arylcarbonato, carboxy, carboxylato, carbamoyl, thiocarbamoyl, carbamato, carbamido, cyano, isocyano, cyanato, isocyanato, isothiocyanato, amino, $C_2$-$C_{24}$ alkylamido, $C_6$-$C_{20}$ arylamido, imino, alkylimino, arylimino, nitro, nitroso, sulfhydryl, $C_1$-$C_{24}$ alkylsulfanyl, $C_5$-$C_{20}$ arylsulfanyl, sulfo, sulfino, sulfonyl, phosphino, phosphono, and O-phosphono, any of which may be unsubstituted or substituted and may contain one or more heteroatoms, and wherein any two adjacent groups selected from $R^1$-$R^4$ may be taken together to form a cycle, wherein such cycle may be aliphatic, aromatic, heteroatom-containing, substituted, or a combination thereof.

In certain embodiments, the anti-skinning agent includes a compound of formula (I), wherein X is oxygen or sulfur, and $R^1$-$R^4$ are hydrogen. Thus, in some embodiments, the anti-skinning agent includes urea or thiourea. In some embodiments, the anti-skinning agent is urea or thiourea.

In certain embodiments, the anti-skinning agent does not include a compound of formula (I), wherein $R^1$-$R^4$ are hydrogen and X is oxygen, simultaneously. Thus, in certain embodiments, the anti-skinning agent includes a compound formula (I), where X, $R^1$-$R^4$ are as described above, with the proviso that the anti-skinning agent does not include urea. In other words, in certain embodiments, the anti-skinning agent includes a derivative of urea with the proviso that the anti-skinning agent does not include urea itself.

In certain embodiments, the anti-skinning agent includes a compound of formula (I), wherein $R^1$-$R^4$ are independently selected from $C_1$-$C_{24}$ alkyl. In certain embodiments, $R^1$-$R^4$ are independently selected from $C_1$-$C_4$ alkyl. In certain embodiments, $R^1$-$R^4$ are independently selected from methyl and ethyl. In certain embodiments, $R^1$-$R^4$ are methyl. Thus, in certain embodiments, the anti-skinning agent includes 1,1,3,3-tetramethylurea or 1,1,3,3-tetramethylthiourea. In some embodiments, the anti-skinning agent is 1,1,3,3-tetramethylurea or 1,1,3,3-tetramethylthiourea.

In certain embodiments, X is sulfur. Thus, in some embodiments, the anti-skinning agent includes a compound of formula (II):

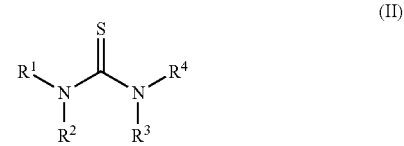

(II)

where $R^1$-$R^4$ are independently selected from hydrogen, halo, $C_1$-$C_{24}$ alkyl, $C_2$-$C_{24}$ alkenyl, $C_2$-$C_{24}$ alkynyl, $C_5$-$C_{20}$ aryl, $C_6$-$C_{24}$ alkaryl, $C_6$-$C_{24}$ aralkyl, hydroxyl, $C_1$-$C_{24}$ alkoxy, $C_2$-$C_{24}$ alkenyloxy, $C_2$-$C_{24}$ alkynyloxy, $C_5$-$C_{20}$ aryloxy, acyloxy, acyl, $C_2$-$C_{24}$ alkoxycarbonyl, $C_6$-$C_{20}$ aryloxycarbonyl, $C_2$-$C_{24}$ alkylcarbonyl, $C_6$-$C_{20}$ arylcarbonyl, halocarbonyl, formyl, thioformyl, $C_2$-$C_{24}$ alkylcarbonato, $C_5$-$C_{20}$ arylcarbonato, carboxy, carboxylato, carbamoyl, thiocarbamoyl, carbamato, carbamido, cyano, isocyano, cyanato, isocyanato, isothiocyanato, amino, $C_2$-$C_{24}$ alkylamido, $C_6$-$C_{20}$ arylamido, imino, alkylimino, arylimino, nitro, nitroso, sulfhydryl, $C_1$-$C_{24}$ alkylsulfanyl, $C_5$-$C_{20}$ arylsulfanyl, sulfo, sulfino, sulfonyl, phosphino, phosphono, and O-phosphono, any of which may be unsubstituted or substituted and may contain one or more heteroatoms, and wherein any two adjacent groups selected from $R^1$-$R^4$ may be taken together to form a cycle, wherein such cycle may be aliphatic, aromatic, heteroatom-containing, substituted, or a combination thereof. In certain embodiments, the anti-skinning agent includes thiourea or a derivative thereof.

In certain embodiments, the anti-skinning agent includes a compound of formula (II), wherein $R^1$-$R^4$ are hydrogen. Thus, in some embodiments, the anti-skinning agent includes thiourea. In some embodiments, the anti-skinning agent is thiourea.

In certain embodiments, the anti-skinning agent includes a compound of formula (II), wherein $R^1$-$R^4$ are independently selected from $C_1$-$C_{24}$ alkyl. In certain embodiments, $R^1$-$R^4$ are independently selected from $C_1$-$C_4$ alkyl. In certain embodiments, $R^1$-$R^4$ are independently selected from methyl and ethyl. In certain embodiments, $R^1$-$R^4$ are methyl. Thus, in certain embodiments, the anti-skinning agent includes 1,1,3,3-tetramethylthiourea. In some embodiments, the anti-skinning agent is 1,1,3,3-tetramethylthiourea.

In certain embodiments, X is oxygen. Thus, in some embodiments, the anti-skinning agent includes a compound of formula (III):

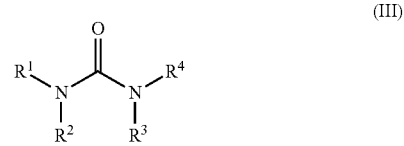

(III)

where $R^1$-$R^4$ are independently selected from hydrogen, halo, $C_1$-$C_{24}$ alkyl, $C_2$-$C_{24}$ alkenyl, $C_2$-$C_{24}$ alkynyl, $C_5$-$C_{20}$ aryl, $C_6$-$C_{24}$ alkaryl, $C_6$-$C_{24}$ aralkyl, hydroxyl, $C_1$-$C_{24}$ alkoxy, C2-C$_{24}$ alkenyloxy, C$_2$-C$_{24}$ alkynyloxy, C$_5$-C$_{20}$ aryloxy, acyloxy, acyl, C$_2$-C$_{24}$ alkoxycarbonyl, C$_6$-C$_{20}$ aryloxycarbonyl, C$_2$-C$_{24}$ alkylcarbonyl, C$_6$-C$_{20}$ arylcarbonyl, halocarbonyl, formyl, thioformyl, C$_2$-C$_{24}$ alkylcarbonato, C$_6$-C$_{20}$ arylcarbonato, carboxy, carboxylato, carbamoyl, thiocarbamoyl, carbamato, carbamido, cyano, isocyano, cyanato, isocyanato, isothiocyanato, amino, C$_2$-C$_{24}$ alkylamido, C$_6$-C$_{20}$ arylamido, imino, alkylimino, arylimino, nitro, nitroso, sulfhydryl, C$_1$-C$_{24}$ alkylsulfanyl, C$_5$-C$_{20}$ arylsulfanyl, sulfo, sulfino, sulfonyl, phosphino, phosphono, and O-phosphono, any of which may be unsubstituted or substituted and may contain one or more heteroatoms, and wherein any two adjacent groups selected from R$^1$-R$^4$ may be taken together to form a cycle, wherein such cycle may be aliphatic, aromatic, heteroatom-containing, substituted, or a combination thereof.

In certain embodiments, the anti-skinning agent includes a compound of formula (I), wherein R$^1$-R$^4$ are hydrogen. Thus, in some embodiments, the anti-skinning agent includes urea. In some embodiments, the anti-skinning agent is urea.

In certain embodiment, the anti-skinning agent does not include a compound of formula (III), wherein R$^1$-R$^4$ are simultaneously hydrogen. Thus, in certain embodiments, the anti-skinning agent includes a compound formula (III), where R$^1$-R$^4$ are as described above, with the proviso that the anti-skinning agent does not include urea. In other words, in certain embodiments, the anti-skinning agent includes a derivative of urea with the proviso that the anti-skinning agent does not include urea itself.

In certain embodiments, the anti-skinning agent includes a compound of formula (III), wherein R$^1$-R$^4$ are independently selected from C$_1$-C$_{24}$ alkyl. In certain embodiments, R$^1$-R$^4$ are independently selected from C$_1$-C$_4$ alkyl. In certain embodiments, R$^1$-R$^4$ are independently selected from methyl and ethyl. In certain embodiments, R$^1$-R$^4$ are methyl. Thus, in certain embodiments, the anti-skinning agent includes 1,1,3,3-tetramethylurea. In some embodiments, the anti-skinning agent is 1,1,3,3-tetramethylurea.

An oxime-free anti-skinning agent of the present disclosure may be a non-polymeric compound. "Polymeric" as used herein, may be used to describe an organic compound composed of repeating units of one or more monomers. Thus, in certain embodiments, an anti-skinning agent of the present disclosure is not part of a polymeric structure, e.g., an aldehyde condensation polymer of a urea-formaldehyde resin.

Compositions
Alkyd Resin Coating Composition

Also provided herein are compositions that contain an anti-skinning agent, e.g. an anti-skinning agent of formula (I), (II) or (III), as described above. In certain embodiments, compositions containing the anti-skinning agent are coating compositions, such as an alkyd resin-based coating composition. In certain embodiments, the anti-skinning agent is present in the alkyd resin coating composition in a sufficient amount to retard or reduce skin formation on the air-exposed surface of the coating composition stored in a container, relative to a comparable coating composition that does not contain the anti-skinning agent. The amount of anti-skinning agent in the alkyd resin coating composition may vary depending on the type of coating composition, and may be 0.0001 wt % or greater, e.g., 0.001 wt % or greater, 0.001 wt % or greater, 0.01 wt % or greater, 0.1 wt % or greater, 1 wt % or greater, 1.5 wt % or greater, 2 wt % or greater, 2.5 wt % or greater, 3 wt % or greater, 3.5 wt % or greater, 4 wt % or greater, 4.5 wt % or greater, including in an amount of about 5 wt % or greater, and may be 4 wt % or less, e.g., 3 wt % or less, 2.5 wt % or less, 2 wt % or less, 1.5 wt % or less, 1 wt % or less, 0.5 wt % or less, 0.1 wt % or less, 0.05 wt % or less, 0.01 wt % or less, 0.005 wt % or less, and including in an amount of 0.001 wt % or less. In certain embodiments, the anti-skinning agent is present in the alkyd resin coating composition in an amount ranging from 0.0001 wt % to 5 wt %, e.g., 0.001 wt % to 5 wt %, 0.005 wt % to 4.5 wt %, 0.01 wt % to 4%, 0.05 wt % to 3.5 wt %, including 0.1 wt % to 3 wt %.

In some cases, a composition of the present disclosure includes a second anti-skinning agent, i.e., an anti-skinning agent other than an oxime compound, in addition to the present oxime-free anti-skinning agent. Other anti-skinning agents, other than an oxime compound, that may be included in a composition of the present disclosure include, but are not limited to, phenols, substituted phenols, hydroquinones, polyphenols, dioxo-compounds, tin compounds, aliphatic amines and their salts, mixtures of organic hydroxylamines and β-dicarbonyl compounds or their derivatives, and natural antioxidants such as (DL-α-tocopherol). In certain embodiments, a composition of the present disclosure includes the oxime-free anti-skinning agent, i.e. an anti-skinning agent of formula (I), (II) or (III), as described above, as the major anti-skinning component, where the oxime-free anti-skinning agent may be greater than 50 wt. %, e.g., 51 wt. % or more, 55 wt. % or more, 60 wt. % or more, 70 wt. % or more, 80 wt. % or more, 90 wt. % or more, 95 wt. % or more, and up to 100 wt. % of the total anti-skinning components in the composition. In some cases, the present oxime-free anti-skinning agent may contribute to greater than 50%, e.g., 51% or more, 55% or more, 60% or more, 70% or more, 80% or more, 90% or more, 95% or more, and up to 100% of the total anti-skinning activity of the anti-skinning components in the composition. In some cases, the present oxime-free anti-skinning agent is essentially the only anti-skinning component contained in the composition.

In some cases, an anti-skinning agent of the present disclosure delays the formation of a skin in a coating composition containing the anti-skinning agent by 1 day or more, e.g., 3 days or more, 5 days or more, 10 days or more, 20 days or more, including 30 days or more, and delays the formation of a skin by 24 months or less, e.g., 12 months or less, 6 months or less, 3 months or less, including 2 months or less, compared to a coating composition that does not contain the anti-skinning agent. In some embodiments, the skin formation in a coating composition containing the anti-skinning agent is delayed by the present anti-skinning agent by a range of 1 day to 24 months, e.g., 3 days to 12 months, 5 days to 6 months, 10 days to 3 months, including 20 days to 2 months, compared to the skin formation in a coating composition that does not contain the anti-skinning agent. In some cases, an anti-skinning agent of the present disclosure delays the formation of a skin in a coating composition containing the anti-skinning agent by 5% or more, e.g., 10% or more, 15% or more, 20% or more, 30% or more, including 50% or more, and delays the formation of a skin by 200% or less, e.g., 150% or less, 120% or less, including 100% or less, compared to a coating composition that does not contain the anti-skinning agent. In some embodiments, the skin formation in a coating composition containing the anti-skinning agent is delayed by the present anti-skinning agent by a range of 5 to 200%, e.g., 10 to 150%, 15 to 120%, including 20 to 100%, compared to the skin formation in a coating composition that does not contain the anti-skinning agent.

As described above, in certain embodiments, compositions containing the anti-skinning agent are air-drying coating compositions. The term "air-drying," as used herein in reference to an air-drying coating composition, refers to compositions that dry or cure when contacted with air, or a similar gaseous composition. In other words, contacting with air may be sufficient to dry or cure the air-drying coating composition. An air-drying composition of the present disclosure may, in some embodiments, cure by an oxidative process, e.g., by oxidative crosslinking of crosslinkable polymers, when contacted with air. Thus, in some cases, a composition of the present disclosure includes a crosslinkable polymer composition, e.g., a crosslinkable alkyd resin, that cures by an oxidative crosslinking process. For example, in some embodiments the curing reaction involves crosslinking of carbon-carbon double or triple bonds present in the resin, e.g., in the alkyd resin. Air-drying may also refer to the process of contacting the subject coating compositions to a gaseous composition, such as atmospheric air, to dry the composition. Methods of air-drying the subject coating compositions are further described below.

Alkyd resins of interest include a crosslinkable polymer precursor composition. The term "crosslink" is used in its conventional sense to refer to the physical (e.g., intermolecular interactions or entanglements, such as through hydrophobic interactions) or chemical (e.g., covalent bonding) interaction between backbone components of the subject polymer precursors. As described in greater detail below, the subject crosslinkable polymer precursor composition in the alkyd resin is subjected to crosslinking conditions to form a crosslinked polymer. The crosslinkable polymer precursor composition may be crosslinked by any convenient crosslinking protocol, including, but not limited to, chemically-initiated crosslinking, oxidative crosslinking, photo-initiated crosslinking as well as crosslinking initiated by changes in heat, pressure or pH. In some instances, crosslinking the crosslinkable polymer precursor in the alkyd resin includes an oxidative process. In some instances, crosslinking the crosslinkable polymer precursor includes reaction of carbon-carbon double or carbon-carbon triple bonds present in the crosslinkable polymer. In certain embodiments, crosslinking the crosslinkable polymer precursor composition includes contacting the crosslinkable polymer precursor composition to atmospheric air for a duration sufficient to oxidatively crosslink the crosslinkable polymer through carbon-carbon double or carbon-carbon triple bonds.

In some embodiments, alkyd resins include unsaturated polyesters prepared from a polyol and a polycarboxylic acid or polycarboxylic anhydride. In certain instances, alkyd resins include unsaturated polyesters prepared from unsaturated polyester is prepared from a polyol, a polycarboxylic acid or polycarboxylic anhydride and an unsaturated fatty acid (i.e., contains one or more carbon-carbon double bond or carbon-carbon triple bond).

The polyol may include two or more hydroxyl groups, such as three or more, such as four or more and including five or more hydroxyl groups. For example, the polyol may be a polyhydric alcohol such as glycerol, propylene glycol, neopentyl glycol, diethylene glycol, pentaerythritol, dipentaerythritol, ethylene glycol, trimethylolpropane, trimethylol ethane, di-trimethylol propane, 1,6-hexane diol and combinations thereof. In some embodiments, the polyol is glycerol. In certain instances, the polyol is propylene glycol.

The polyol component may have a molecular weight which varies depending on the properties of the alkyd resin desired (e.g., wettability, mechanical properties, resistance to degradation, etc.), and may be 0.1 kDa or greater, such as 0.125 kDa or greater, such as 0.15 kDa or greater and including 0.25 kDa or greater, such as 0.5 kDa or greater, such as 0.75 kDa or greater and including 1 kDa or greater. Likewise, the amount of polyol in alkyd resins of interest may vary. For instance, polyol may be present in the subject alkyd resins containing crosslinkable polymer precursors in an amount ranging from 1% to 50% w/w, such as 2% to 49% w/w, such as 5% to 45% w/w, such as 10% to 40% w/w, such as 15% to 35% w/w and including 20% to 30% w/w.

In some embodiments, alkyd resins include unsaturated polyesters prepared from a polyol and a polycarboxylic acid. The polycarboxylic acid may include two or more carboxylic acid groups, such as three or more, such as four or more and including five or more carboxylic acid groups. Suitable polycarboxylic acids include dicarboxylic acids, tricarboxylic acids, tetracarboxylic acids, pentacarboxylic acids, as well as higher polycarboxylic acids. The polycarboxylic acid may include aromatic, aliphatic and cycloaliphatic polycarboxylic acids. For example, the polycarboxylic acid may be a polyacid such as maleic acid, fumaric acid, adipic acid, azelaic acid, phthalic acid and its regio-isomeric analogues, trimellitic acid, pyromellitic acid, pimelic acid, sebacic acid, benzoic acid, para-tertiarybutylbenzoic acid and tetra-hydrophthalic acid and combinations thereof.

The polycarboxylic acid may have a molecular weight which varies depending on the properties of the alkyd resin desired (e.g., wettability, mechanical properties, resistance to degradation), and may be 0.25 kDa or greater, such as 0.5 kDa or greater, such as 0.75 kDa or greater, such as 1 kDa or greater, such as 1.5 kDa or greater, such as 2 kDa or greater, such as 2.5 kDa or greater, and including 3 kDa or greater. Likewise, the amount of polycarboxylic acid in alkyd resins of interest may vary. For instance, polycarboxylic acid may be present in the subject alkyd resins containing crosslinkable polymer precursors in an amount ranging from 1% to 50% w/w, such as 2% to 49% w/w, such as 5% to 45% w/w, such as 10% to 40% w/w, such as 15% to 35% w/w and including 20% to 30% w/w.

In certain embodiments, the subject alkyd resin coating compositions include unsaturated polyesters prepared from a polyol and a polycarboxylic acid anyhydride. For example, the polycarboxylic anhydride may be an aromatic, aliphatic or cycloaliphatic polycarboxylic acid anhydrides. For example, the polycarboxylic acid anhydride may be maleic anhydride, adipic anhydride, azelaic anhydride, phthalic anhydride and its regio-isomeric analogues, trimellitic anhydride, pyromellitic anhydride, pimelic acid anhydride, sebacic anhydride, benzoic acid anhydride, para-tertiarybutylbenzoic acid anhydride and tetra-hydrophthalic anhydride and combinations thereof.

The polycarboxylic acid anhydride may have a molecular weight which varies depending on the properties of the alkyd resin desired (e.g., wettability, mechanical properties, resistance to degradation), and may be 0.25 kDa or greater, such as 0.5 kDa or greater, such as 0.75 kDa or greater, such as 1 kDa or greater, such as 1.5 kDa or greater, such as 2 kDa or greater, such as 2.5 kDa or greater, and including 3 kDa or greater. Likewise, the amount of polycarboxylic anhydride in alkyd resins of interest may vary. For instance, polycarboxylic anhydride may be present in the subject alkyd resins containing crosslinkable polymer precursors in an amount ranging from 1% to 50% w/w, such as 2% to 49% w/w, such as 5% to 45% w/w, such as 10% to 40% w/w, such as 15% to 35% w/w and including 20% to 30% w/w.

In some embodiments, the ratio of the polyol to the polycarboxylic acid or polycarboxylic acid anhydride may vary, ranging between 10:1 and 9.5:1; 9.5:1 and 9:1; 9:1 and 8.5:1; 8.5:1 and 8:1; 8:1 and 7.5:1; 7.5:1 and 7:1; 7:1 and 6.5:1; 6.5:1 and 6:1; 6:1 and 5.5:1; 5.5:1 and 5:1; 5:1 and 4.5:1; 4.5:1 and 4:1; 4:1 and 3.5:1; 3.5:1 and 3:1; 3:1 and 2.5:1; 2.5:1 and 2:1; 2:1 and 1.5:1; 1.5:1 and 1:1 or a range thereof. For example, the mass ratio of the polyol to the polycarboxylic acid or polycarboxylic acid anhydride may range from 10:1 and 1:1, such as 8:1 and 1:1, such as 5:1 and 1:1, such as 4:1 and 1:1, and including from 2:1 and 1:1. In certain instances, the ratio of polyol to the polycarboxylic acid or polycarboxylic acid anhydride is 1:1.

In other embodiments, the ratio of polyol to the polycarboxylic acid or polycarboxylic acid anhydride may vary, in some embodiments ranging between 1:1 and 1:1.5; 1:1.5 and 1:2; 1:2 and 1:2.5; 1:2.5 and 1:3; 1:3 and 1:3.5; 1:3.5 and 1:4; 1:4 and 1:4.5; 1:4.5 and 1:5; 1:5 and 1:5.5; 1:5.5 and 1:6; 1:6 and 1:6.5; 1:6.5 and 1:7; 1:7 and 1:7.5; 1:7.5 and 1:8; 1:8 and 1:8.5; 1:8.5 and 1:9; 1:9 and 1:9.5; 1:9.5 and 1:10 or a range thereof. For example, the ratio of polyol to the polycarboxylic acid or polycarboxylic acid anhydride may range from 1:1 and 1:10, such as 1:1 and 1:8, such as 1:1 and 1:5, such as 1:1 and 1:4, and including from 1:1 and 1:2.

In some embodiments, the polyol, the polycarboxylic acid or polycarboxylic acid anhydride or both the polyol and polycarboxylic acid or polycarboxylic acid anhydride are unsaturated. The term "unsaturated" is used herein in its conventional sense to refer to having one or more carbon-carbon double or triple bonds, such as for example two or more carbon-carbon double or triple bonds, such as three or more carbon-carbon double or triple bonds, such as five or more carbon-carbon double or triple bonds and including ten or more carbon-carbon double or triple bonds. In some embodiments, the polyol is unsaturated. In other embodiments, the polycarboxylic acid or polycarboxylic acid anhydride is unsaturated. In yet other embodiments, the polyol and the polycarboxylic acid or polycarboxylic acid anhydride are both unsaturated.

In certain embodiments, the alkyd resin composition includes unsaturated polyesters prepared from a polyol, a polycarboxylic acid or a polycarboxylic acid anyhydride and one or more unsaturated fatty acids. Unsaturated fatty acids of interest may include conjugated or non-conjugated fatty acids derived from natural or synthetic oils, such as $C_2$-$C_{24}$ carboxylic acids. For example, unsaturated fatty acids of interest may include, but are not limited to linoleic acid, linolenic acid, oleic acid, ricinoleic acid, licanic acid and eleostearic acids and combinations thereof. In certain embodiments, unsaturated fatty acids may be bonded to a carbohydrate moiety, such as sucrose.

Unsaturated fatty acids of interest may have a molecular weight which varies depending on the properties of the alkyd resin desired (e.g., wettability, mechanical properties, resistance to degradation), and may in some instances be 0.25 kDa or greater, such as 0.5 kDa or greater, such as 0.75 kDa or greater, such as 1 kDa or greater, such as 1.5 kDa or greater, such as 2 kDa or greater, such as 2.5 kDa or greater, such as 3 kDa or greater, such as 4 kDa or greater, and including 5 kDa or greater, and may in some instances be 6 kDa or less, e.g., such as 5 kDa or less, such as 4 kDa or less, such as 3 kDa or less, such as 2 kDa or less, such as 1 kDa or less, and including 0.5 kDa or less. Likewise, the amount of unsaturated fatty acid in alkyd resins of interest may vary. For instance, the unsaturated fatty acid may be present in alkyd resins containing crosslinkable polymer precursors in an amount ranging from 1% to 90% w/w, such as 5% to 80% w/w, such as 10% to 75% w/w, such as 10% to 70% w/w, such as 15% to 60% w/w and including 20% to 50% w/w.

In some embodiments of the disclosure, the ratio of polycarboxylic acid or polycarboxylic acid anhydride to unsaturated fatty acid may vary, in some embodiments ranging between 10:1 and 9.5:1; 9.5:1 and 9:1; 9:1 and 8.5:1; 8.5:1 and 8:1; 8:1 and 7.5:1; 7.5:1 and 7:1; 7:1 and 6.5:1; 6.5:1 and 6:1; 6:1 and 5.5:1; 5.5:1 and 5:1; 5:1 and 4.5:1; 4.5:1 and 4:1; 4:1 and 3.5:1; 3.5:1 and 3:1; 3:1 and 2.5:1; 2.5:1 and 2:1; 2:1 and 1.5:1; 1.5:1 and 1:1 or a range thereof. For example, the mass ratio of the polycarboxylic acid or polycarboxylic acid anhydride to unsaturated fatty acid may range from 10:1 and 1:1, such as 8:1 and 1:1, such as 5:1 and 1:1, such as 4:1 and 1:1, and including from 2:1 and 1:1. In certain instances, the ratio of polycarboxylic acid or polycarboxylic acid anhydride to unsaturated fatty acid is 1:1.

In other embodiments, the mass ratio of polycarboxylic acid or polycarboxylic acid anhydride to unsaturated fatty acid may vary, in some embodiments ranging between 1:1 and 1:1.5; 1:1.5 and 1:2; 1:2 and 1:2.5; 1:2.5 and 1:3; 1:3 and 1:3.5; 1:3.5 and 1:4; 1:4 and 1:4.5; 1:4.5 and 1:5; 1:5 and 1:5.5; 1:5.5 and 1:6; 1:6 and 1:6.5; 1:6.5 and 1:7; 1:7 and 1:7.5; 1:7.5 and 1:8; 1:8 and 1:8.5; 1:8.5 and 1:9; 1:9 and 1:9.5; 1:9.5 and 1:10 or a range thereof. For example, the mass ratio of polycarboxylic acid or polycarboxylic acid anhydride to unsaturated fatty acid may range from 1:1 and 1:10, such as 1:1 and 1:8, such as 1:1 and 1:5, such as 1:1 and 1:4, and including from 1:1 and 1:2.

Where the subject alkyd resin coating compositions are crosslinked through one or more carbon-carbon double bonds or carbon-carbon triple bonds, the amount of unsaturated compound in the alkyd resin composition may vary, such as about 1 mol % or more of the unsaturated compound, such as 2 mol % or more, such as 3 mol % or more, such as 4 mol % or more and including 10 mol % or more. For example, the amount of unsaturated compound in the alkyd resin composition may range from 0.01 mol % to 25 mol %, such as from 0.05 mol % to 9.5 mol %, such as from 0.1 mol % to 9 mol %, such as from 0.5 mol % to 8.5 mol %, such as from 1 mol % to 8 mol %, such as from 2 mol % and 7 mol % and including from 3 mol % and 6 mol %.

The amount of crosslinkable organic medium in coating compositions of interest may vary depending on the alkyd resins (e.g., unsaturation content, etc.) as well as the extent of crosslinking in the alkyd resin desired and may be present in an amount of 1% w/w or more, such as 2% w/w or more, such as 3% w/w or more, such as 5% w/w or more, such as 10% w/w or more, such as 25% w/w or more and including 50% w/w or more. In some instances, the amount of crosslinkable organic medium present in the subject coating compositions ranges from 1% to 50%, such as from 2% w/w to 45% w/w, such as from 3% w/w to 40% w/w, such as from 5% w/w to 35% w/w, such as from 10% w/w to 30% w/w and including from 15% w/w to 25% w/w.

Suitable alkyd resin coating compositions are described in, e.g., U.S. Pat. Nos. 5,959,067; 5,158,608; 5,055,548; 5,053,483; 4,997,480 and 4,025,475, which are incorporated herein by reference. Suitable alkyd resins are also available commercially, e.g., BECKOSOL® alkyd resins from Reichold, URALAC™ alkyd resins from DSM, DELTECH alkyd resins from Deltech Resin Co., and Sefose® alkyd resins from Proctor & Gamble.

In certain embodiments, coating compositions of interest may be formulated as an ink, resin, varnish, coating, polish, finish, thermoset resin, wood stain, floor sealant or paint. In some instances, coating compositions of interest having an alkyd resin and an anti-skinning agent containing a compound of formula (I), (II) or (III), for example, are formulated as an ink, such as a metal plate ink, lithographic ink, relief printing ink, screen ink or offset overprinting ink. In still other instances, coating compositions of interest having an alkyd resin and an anti-skinning agent containing a compound of formula (I), (II) or (III), as described above, are formulated as a wood stain, such wood dye stains, semi-gloss stains, gloss stains, high gloss stain and satin wood stains. In certain instances, coating compositions of interest having an alkyd resin and an anti-skinning agent containing a compound of formula (I), (II) or (III), as described above, are formulated as a paint, such as eggshell paints, semi-gloss paints, flat paints, gloss paints, primer-type paints, basecoat-type paints and finish coat-type paints. In certain embodiments, coating compositions of interest having an alkyd resin and an anti-skinning agent containing a compound of formula (I), (II) or (III), as described above, are formulated as a sprayable aerosol composition. Methods of formulating an aerosol alkyd paint are described in, e.g., U.S. App. Pub. Nos. 20080033099 and 20080008678, which are incorporated herein by reference.

In certain embodiments, the subject alkyd resin coating composition that includes the anti-skinning agent containing a compound of formula (I), (II) or (III), as described above, is free of skin formation for a longer time under storage than a control composition, e.g., a comparable alkyd resin coating composition that does not contain the anti-skinning agent.

Drier

In certain embodiments, coating compositions of interest further include a drier. The term "drier" is used herein in its conventional sense to refer to one or more compounds which enhances drying of the subject coating compositions, such as compared to a suitable control composition that is identical to the subject coating compositions but for the presence of the drier (such as described in greater detail below). As described herein, "enhancing" the drying of the subject compositions may include one or more of accelerating the initiation (i.e., reducing the amount time for drying to begin) of composition drying, increasing the overall rate of composition drying (i.e., reducing the amount of time for composition curing to be complete) and increasing the overall extent of composition drying. By "drying" or "curing" is meant to become hard and substantially free of liquid. In some instances, a drier, e.g., a through drier, ensures a uniform rate of drying throughout the coating composition when applied to a solid surface. Thus, the drying rate of a coating composition applied to a solid surface is more uniform between the surface of the applied coating and underneath the surface of the applied coating when a through drier is present in the coating composition compared to a suitable control composition. In certain embodiments, driers may include auxiliary driers that modify the effect of other driers but do not enhance drying on their own.

In certain embodiments, the drier includes an organometallic salt, such as a metal carboxylate. A metal carboxylate is a compound having the general formula $M^{x+}[(RCOO)^{-1}]_x$, wherein M represents the metal with valence x and R represents a carboxylate group, including an aliphatic, substituted aliphatic, aromatic, substituted aromatic, cycloalkyl, or substituted cycloalkyl carboxylate group. The metal carboxylate may be formed by any suitable method. In certain embodiments, the metal carboxylate is produced by reacting a metal with an organic acid dissolved in a hydrocarbon solvent. The carboxylic acid component of the metal carboxylate may be any suitable carboxylate, and may be a naturally derived carboxylate or a synthetic compound. Exemplary carboxylates include, but are not limited to, acetates, propionates, octoates, tallates (linoresinates), rosinates (abietates), laurates, oleates, octadecanoates, neodecanoates, linoleates, naphthenates, versatates, or hexanoates, and may include 2-ethylhexanoate, isononanoate, etc.

The metal carboxylate may be formed with any suitable metal for use as a drier in the coating composition. In certain embodiments, the metal carboxylate contains a transition metal. In certain embodiments, the metal carboxylate contains a metal selected from lithium, sodium, potassium, magnesium, calcium, strontium, barium, titanium, zirconium, cerium, vanadium, neodymium, manganese, rhenium, iron, ruthenium, cobalt, rhodium, nickel, palladium, platinum, copper, silver, gold, zinc, aluminium, tin, lead, or bismuth. In some embodiments, the metal carboxylate contains a metal selected from lithium, potassium, calcium, strontium, barium, zirconium, cerium, vanadium, neodymium, manganese, iron, cobalt, rhodium or zinc. In some embodiments, the metal carboxylate contains a metal selected from cerium, vanadium, manganese, iron or cobalt. In certain embodiments, a through drier metal carboxylate may include a metal selected from lead, zirconium, lithium, strontium, cerium, neodymium, potassium and aluminum. In certain embodiments, an auxiliary drier metal carboxylate may include a metal selected from calcium, barium and zinc.

Various metal salts that may be used as driers are described in, e.g., U.S. App. Pub. Nos. 20130102709, 20110301289 and 20050245639, which are incorporated herein by reference. A description of metal driers, their functions, and methods for using them, may also be found in *Handbook of Coatings Additives*, p. 496-506, ed. by L. J. Calbo, Marcel Dekker, Inc. New York, N.Y., 1987; and Bieleman, J. and Lomolder, R., "Chapter 7: Catalytically Active Additives" in *Additives for Coatings*, J. Bieleman (ed.), Wiley-VCH (2000); and van Gorkum, R., Bouwman, E., "*The oxidative drying of alkyd paint catalysed by metal complexes*." Coordination Chemistry Reviews, 249 1709-1728 (2005) which are incorporated herein by reference.

The amount of drier in the alkyd resin coating composition may vary depending on the type of coating composition, and may be 0.0001 wt % or greater, e.g., 0.001 wt % or greater, 0.01 wt % or greater, 0.1 wt % or greater, 1 wt % or greater, 1.5 wt % or greater, 2 wt % or greater, 2.5 wt % or greater, 3 wt % or greater, 3.5 wt % or greater, 4 wt % or greater, 4.5 wt % or greater, including in an amount of about 5 wt % or greater, and may be 4 wt % or less, e.g., 3 wt % or less, 2.5 wt % or less, 2 wt % or less, 1.5 wt % or less, 1 wt % or less, 0.5 wt % or less, 0.1 wt % or less, 0.05 wt % or less, 0.01 wt % or less, 0.005 wt % or less, and including in an amount of 0.001 wt % or less. In certain embodiments, the drier is present in the alkyd resin coating composition in an amount ranging from 0.0001 wt % to 5 wt %, e.g., 0.001 wt % to 5 wt %, 0.005 wt % to 4.5 wt %, 0.01 wt % to 4%, 0.05 wt % to 3.5 wt %, including 0.1 wt % to 3 wt %.

The amount of a metal carboxylate in the alkyd resin coating composition may vary depending on the type of coating composition. The amount of metal content of the metal carboxylate in the alkyd resin coating composition expressed as a percentage of the total resin solids may be 0.0001 wt % or greater, e.g., 0.001 wt % or greater, 0.001 wt % or greater, 0.01 wt % or greater, 0.1 wt % or greater, 1 wt % or greater, including in an amount of about 2 wt % or greater, and may be 1.5 wt % or less, e.g., 1 wt % or less, 0.5 wt % or less, 0.1 wt % or less, 0.05 wt % or less, 0.01 wt % or less, 0.005 wt % or less, and including in an amount of 0.001 wt % or less. In certain embodiments, the amount of metal content of the metal carboxylate in the alkyd resin coating composition expressed as a percentage of the total resin solids may range from 0.0001 wt % to 2 wt %, e.g., 0.001 wt % to 1.5 wt %, 0.005 wt % to 1 wt %, including 0.01 wt % to 1 wt %.

In some embodiments, driers of interest accelerate the initiation of coating composition drying, such as by reducing the required time for the coating composition to begin drying by 5% or more, such as by 10% or more, such as by 25% or more, such as by 50% or more, such as by 75% or more, such as by 90% or more, such as 95% or more, as compared to a suitable control. For example, driers of interest may reduce the amount of time required for the coating composition to begin drying by 0.1 hours or more, such as by 0.5 hours or more, such as by 1 hour or more, such as by 1.5 hours or more, such as by 2 hours or more and including reducing the amount of time required for the coating composition to begin drying by 6 hours or more, as compared to a suitable control.

In other embodiments, driers of interest accelerate the overall rate of coating composition drying, such as by reducing the total amount of time for the coating composition to complete drying by 2% or more, such as by 5% or more, such as by 10% or more, such as by 25% or more, such as by 50% or more, such as by 75% or more, such as by 100% or more, such as by 200% or more, including by 500% or more, as compared to a suitable control. For example, driers of interest may reduce the total amount of time for the coating composition to complete drying by 0.5 hours or more, such as by 1 hour or more, such as by 2 hours or more, such as by 3 hours or more, such as by 6 hours or more, such as by 12 hours or more and including reducing the total amount of time for the composition to dry completely by 24 hours or more.

In still other embodiments, driers of interest increase the overall extent of coating composition drying. For example, driers may increase the extent of coating composition drying by 1% or more, such as by 5% or more, such as by 10% or more, such as by 25% or more, such as by 50% or more, such as by 75% or more, such as by 90% or more, such as 95% or more and including increasing the extent of composition drying by 99% or more.

As described in greater detail below, drying the subject coating compositions may include crosslinking a crosslinkable polymer precursor in the alkyd resin. In these embodiments, the drier enhances crosslinking of the crosslinkable polymer precursor, such as by accelerating the initiation (i.e., reducing the amount time for crosslinking to begin) of crosslinking of the crosslinkable polymer precursor, raising the overall rate of crosslinking (i.e., reducing the total amount of time for crosslinking the crosslinkable polymer precursor to completion) as well as increasing the overall extent of crosslinking.

In one example, driers of interest reduce the amount of time required for the crosslinking of the crosslinkable polymer precursor of the alkyd resin to begin by 5% or more, such as by 10% or more, such as by 25% or more, such as by 50% or more, such as by 75% or more, such as by 90% or more, such as 95% or more, as compared to a suitable control. For instance, the amount of time required to initiate crosslinking the crosslinkable polymer precursor may be reduced by 0.1 hours or more, such as by 0.5 hours or more, such as by 1 hour or more, such as by 1.5 hours or more, such as by 2 hours or more and including reducing the amount of time required for the crosslinking of the crosslinkable polymer precursor to begin by 6 hours or more.

In another example, driers increase the rate of crosslinking of the crosslinkable polymer precursor of the alkyd resin by 2% or more, such as by 5% or more, such as by 10% or more, such as by 25% or more, such as by 50% or more, such as by 75% or more, such as by 100% or more, such as by 200% or more, including by 500% or more, as compared to a suitable control. For instance, the total amount of time required to complete crosslinking of the crosslinkable polymer precursor of the alkyd resin by 0.5 hours or more, such as by 1 hour or more, such as by 2 hours or more, such as by 3 hours or more, such as by 6 hours or more, such as by 12 hours or more and including reducing the total amount of time for the composition to complete crosslinking of the crosslinkable polymer precursor of the alkyd resin by 24 hours or more.

In yet another example, driers increase the overall extent of crosslinking of the crosslinkable polymer precursor of the alkyd resin by 1% or more, such as by 5% or more, such as by 10% or more, such as by 25% or more, such as by 50% or more, such as by 75% or more, such as by 90% or more, such as 95% or more and including increasing the extent of crosslinking by 99% or more.

Complexing Agent

In certain embodiments, the subject alkyd resin coating composition includes a drier that is complexed with a complexing agent or ligand. In some embodiments, the subject alkyd resin coating composition includes a metal carboxylate complexed with a complexing agent, e.g., complexed with a chelating agent or ligand. Thus, a metal carboxylate complexed with a complexing agent may be described by the formula: $M^{x+}[(RCOO)^{-1}]_x(L)_o$, where M, R and x are as described above, and L is a complexing ligand and o is the number of such complexing ligands, which may be 1 or more.

In certain embodiments, the complexing agent includes a compound containing nitrogen, oxygen, phosphorous, sulfur, or a combination thereof. Suitable complexing agents include 2,2'-bipyridyl, imidazoles, pyrazoles, 1,10-phenanthroline, 1,4,7-trimethyl-1,4,7-triazacyclononane, amino acids, cyclodextrins, and the like. Examples of metal complexing agents are described in, e.g., U.S. App. Pub. Nos. 20110301289, 20070213426, and 20050245639, which are incorporated herein by reference.

In certain embodiments, the complexing agent is a drier accelerator, wherein the drier accelerator enhances the drying-promoting effect of the drier. In certain embodiments, the complexing agent is a chelating agent. "Chelate," as used herein in reference to a complex between a metal carboxylate and a chelating ligand, refers to a combination of a metallic ion bonded to one or more ligands to form a heterocyclic ring structure. Chelate formation through neutralization of the positive charge(s) of the metal ion may be through the formation of ionic, covalent or coordinate covalent bonding. In certain embodiments, the chelating agent is a drier accelerator that further enhances the drying rate of an alkyd resin coating composition that contains the drier, such as a metal carboxylate drier, and the chelating agent, compared to a suitable control. Exemplary chelating agents include, but are not limited to, 1,10-phenanthroline and 2,2'-bipyridyl.

In certain embodiments, the drier, e.g., a metal carboxylate drier, is pre-complexed with the complexing agent before the drier is added to the subject compositions. Thus, in some instances, the drier is combined with the complexing agent and then the complexed drier is combined with the coating composition.

Other Coating Composition Additives

In some embodiments, the subject coating compositions further include one or more radical-generating compounds, such as peroxides and the like. In certain instances, radical-generating compounds enhance drying by initiating polymerization of reactive unsaturated groups present. For example, suitable chemical initiators may include, but are not limited to, initiators which produce free radicals such as peroxides (e.g., dialkyl peroxides such as t-butyl peroxide and 2,2 bis(t-butylperoxy)propane, diacyl peroxides such as benzoyl peroxide and acetyl peroxide, peresters such as t-butyl perbenzoate and t-butyl per-2-ethylhexanoate, perdicarbonates such as dicetyl peroxy dicarbonate and dicyclohexyl peroxy dicarbonate, ketone peroxides such as cyclohexanone peroxide and methylethylketone peroxide, and hydroperoxides such as cumene hydroperoxide and tert-butyl hydroperoxide), azo compounds (e.g., azobisisobutyronitrile (AIBN) and azobis-(2,4-dimethylvaleronitrile), aliphatic azo compounds) as well as initiators which produce a positively charged species such as an acid-forming initiator like boron trifluoride, initiators which produce negatively charged species such as metal amides, alkoxides, hydroxides, cyanides, phosphines, amines, as well as organometallic compounds, like alkyllithium compounds, Ziegler catalysts or Grignard reagents. The radical-generating compound may be present in any convenient amount, and in some instances is present in an amount of 0.01 wt % or more, such as 0.05 wt % or more, such as 0.1 wt % or more, such as 0.5 wt % or more, such as 1.0 wt % or more, such as 1.5 wt % or more, such as 2 wt % or more, such as 3 wt % or more, such as 4 wt % or more and including in an amount of 5 wt % or more. For example, the amount of radical-generating compound may range from 0.01 wt % to 10 wt %, such as from 0.05 wt % to 9.5 wt %, such as from 0.1 wt % to 9 wt %, such as from 0.5 wt % to 8.5 wt %, such as from 1 wt % to 8 wt %, such as from 2 wt % to 7 wt % and including from 3 wt % to 6 wt %.

In embodiments where the subject coating compositions include one or more radical-generating compounds, the coating compositions may be configured to initiate radical generation at any suitable temperature, such as at a temperature ranging from 50° C. to 200° C., such as from 60° C. to 190° C., such as from 75° C. to 180° C., such as from 80° C. to 170° C., such as from 85° C. to 160° C., such as from 90° C. to 155° C. and including from 50° C. to 100° C., such as from 50° C. to 90° C., such as from 50° C. to 85° C., such as from 50° C. to 75 and including 50° C. to 70° C.

In some embodiments, coating compositions of interest further include one or more additional excipients, including but not limited to colorants, pigment, anti-corrosives, extenders, stabilizers, dye, surfactants, emulsifiers, plasticizers, surface-controlling agents, anti-silking agents, defoaming agents, rheological controlling agents, active metal carbonates, nitrogen-containing ligands, binders, fillers, anti-reflective agents, diluents, and toughening agents as well as ultraviolet absorbers.

In certain embodiments, coating compositions of interest having an alkyd resin and an anti-skinning agent containing a compound of formula (I), (II) or (III), as described above, further include a colorant, such as a dye or pigment. Example dye compounds of interest include, but are not limited to, a monoazo dye, a diazo dye, an azo salt, a metallic azo complex, a benzimidazole compound, a pthalocyanide, and anthraquinone, a quinacridone, a dioxazine, a perylene compound, a thioindigo, carbon black, titanium dioxide, an iron oxide, a zinc chromate, an Azurite, a chromium oxide, a calcium sulfide acridine dyes, anthraquinone dyes, arylmethane dyes, azo dyes, diazonium dies, nitro dyes, nitroso dyes, phthalocyanine dyes, quinone-imine dyes, thiazole dyes, xanthene dyes, and combinations thereof. Where the subject coating compositions are formulated as a paint, pigments of interest may also include metal compounds such as oxides (e.g., titanium dioxide, cobalt oxide, aluminum oxide, lead oxide, iron oxide, manganese oxide, mixtures thereof, etc.), chromates (e.g., barium chromate, strontium chromate, lead chromate, mixtures thereof, etc.), silicates (e.g., calcium copper silicate, aluminosilicates, mixtures thereof, etc.), sulfides and sulfates (e.g., cadmium sulfide, arsenic sulfide, lead sulfate, combinations thereof, etc.), nitrites (e.g., potassium cobaltinitrite, etc.), carbonates (e.g., calcium carbonate), metal complexes (e.g., copper acetate, iron hexacyanoferrate, copper carbonate, copper acetoarsenite, copper phthalocyanine, nickel azo yellow, etc.), as well as hydrates, partial hydrates, doped forms, and combinations thereof.

The amount of colorant (e.g., dye) in coating compositions of interest may vary, the amount of colorant ranging from 0.01% to 35% w/w, such as 0.05% to 9.5% w/w, such as 0.1% to 9%, such as 0.5% to 8.5% w/w and including 1% to 8% w/w. In other embodiments, the amount of colorant (e.g., dye) is 0.01% by weight or greater of the total weight of the subject composition, such as 0.05% by weight or greater, such as 0.1% by weight or greater, such as 0.5% by weight or greater, such as 1% by weight or greater, such as 2% by weight or greater and including 5% by weight or greater of the total weight of the composition.

In certain embodiments, coating compositions of interest further include an extender, such as flattening agents, deglossing agents and the like. Extender compounds may include, but are not limited to calcium carbonate, talc, barium sulfates, kaolin, aluminum silicates, aluminum-potassium silicates, silica, mica and combinations thereof. The amount of extender in coating compositions of interest may vary, ranging from 0.01% to 5% w/w, such as 0.05% to 4.5% w/w, such as 0.1% to 4%, such as 0.5% to 3.5% w/w and including 1% to 15% w/w. In other embodiments, the amount of extender is 0.01% by weight or greater of the total weight of the subject composition, such as 0.05% by weight or greater, such as 0.1% by weight or greater, such as 0.5% by weight or greater, such as 1% by weight or greater, such as 1.5% by weight or greater and including 2% by weight or greater of the total weight of the composition.

In some embodiments, coating compositions of interest further include a surfactant. Surfactants of interest include, but are not limited to, polysorbates, such as "Tween 20" and "Tween 80," and pluronics such as F68 and F88 (BASF, Mount Olive, N.J.); sorbitan esters; lipids, such as phospholipids such as lecithin and other phosphatidylcholines, phosphatidylethanolamines (although preferably not in liposomal form), fatty acids and fatty esters; steroids, such as cholesterol; chelating agents, such as EDTA and any combination thereof. The amount of surfactant in coating compositions of interest may vary, ranging from 0.01% to 5% w/w, such as 0.05% to 4.5% w/w, such as 0.1% to 4%, such as 0.5% to 3.5% w/w and including 1% to 3% w/w. In other embodiments, the amount of surfactant is 0.01% by weight or greater of the total weight of the subject composition, such as 0.05% by weight or greater, such as 0.1% by weight or greater, such as 0.5% by weight or greater, such as 1% by weight or greater, such as 1.5% by weight or greater and including 2% by weight or greater of the total weight of the composition.

In certain instances, the subject coating compositions include a biocide or anti-microbial agent so as to prevent or deter microbial growth, such as for example benzalkonium chloride, benzethonium chloride, benzyl alcohol, cetylpyridinium chloride, chlorobutanol, phenol, phenylethyl alcohol, thimersol, and any combinations thereof. The amount of surfactant in coating compositions of interest may vary, ranging from 0.001% to 2% w/w, such as 0.005% to 1.75% w/w, such as 0.01% to 1.5%, such as 0.05% to 1.25% w/w and including 0.1% to 1% w/w. In other embodiments, the amount of biocide or anti-microbial agent is 0.001% by weight or greater of the total weight of the subject composition, such as 0.005% by weight or greater, such as 0.01% by weight or greater, such as 0.05% by weight or greater, such as 0.1% by weight or greater, such as 0.5% by weight or greater and including 1% by weight or greater of the total weight of the composition.

In some embodiments, coating compositions of interest further include a dispersant or emulsifier. In these embodiments, the dispersant may also function as a stabilizer. Examples of dispersants and emulsifiers include, but are not limited to, sodium lauryl sulfate, sodium dodecyl benzene sulfonate, dioctylsulfosuccinate, sodium polyoxyethylene lauryl ether sulfate, sodium dodecyl diphenyloxide disulfonate and other diphenylsulfonate derivatives and combinations thereof as well as surfactants manufactured by Rohm & Haas under the trademark OROTAN® (e.g., 1124, 1288, 731 DP and 850). The amount of dispersant or emulsifier in coating compositions of interest may vary, ranging from 0.01% to 5% w/w, such as 0.05% to 4.5% w/w, such as 0.1% to 4%, such as 0.5% to 3.5% w/w and including 1% to 3% w/w. In other embodiments, the amount of dispersant or emulsifier is 0.01% by weight or greater of the total weight of the subject coating composition, such as 0.05% by weight or greater, such as 0.1% by weight or greater, such as 0.5% by weight or greater, such as 1% by weight or greater, such as 1.5% by weight or greater and including 2% by weight or greater of the total weight of the composition.

In certain embodiments, a subject coating composition formulated as a sprayable aerosol composition may contain a propellant, which may be a liquefiable gas having a vapor pressure sufficient to propel the aerosol composition from a container, e.g. a spray can. In certain embodiments, the propellant is selected from the group consisting of ethers, such as dimethyl ether (DME) and diethyl ether; C1-C4 saturated hydrocarbons, such as methane, ethane, propane, n-butane, and isobutane; hydrofluorocarbons (HFC), such as 1,1,1,2-tetrafluoroethane (HFC-134a), 1,1,1,2,3,3,3,-heptafluoropropane (HFC-227HFC), difluoromethane (HFC-32), 1,1,1-trifluoroethane (HFC-143a), 1,1,2,2-tetrafluoroethane (HFC-134), and 1,1-difluoroethane (HFC-152a); and mixtures thereof. In some instances, the propellant is a blend of n-butane and propane.

Organic solvents may also be added to the subject coating composition in order to reduce the viscosity. Hydrocarbon, ester, ketone, ether, ether-ester, alcohol, or ether-alcohol type solvents may be used individually or in mixtures. Examples of suitable solvents include, but are not limited to, benzene, toluene, xylene, aromatic, acetone, methylethyl ketone, methyl amyl ketone, butyl acetate, t-butyl acetate, tetrahydrofuran, diethyl ether, ethylethoxy propionate, isopropanol, butanol, butoxyethanol, hydroxylethers, N-methylpyrrolidone and so on. The amount of organic solvent in the subject coating composition may vary depending on the desired viscosity and/or other properties of the coating composition, and may be 80 wt % or less, e.g., 60 wt % or less, 50 wt % or less, 40 wt % or less, 30 wt % or less, 25 wt % or less, 20 wt % or less, 15 wt % or less, 10 wt % or less, 5 wt % or less, or about 0 wt %, and may be in the range of 0 to 70 wt %, e.g., 10 to 65 wt %, 20 to 60 wt %, 30 to 55 wt %, or 40 to 50 wt %.

In certain embodiments, the subject coating compositions have a reduced amount of volatile organic content (VOC), such as reduced amount of solvent, and concomitantly a high amount of solids. In certain embodiments, the high solids, low VOC coating composition is produced by reducing the amount of fatty acid, the amount of unsaturation of the fatty acid, the molecular weight of the resin, or a combination thereof, in the composition. The amount of VOC in the high solids, low VOC coating composition may be 40 wt % or less, e.g., 30 wt % or less, 25 wt % or less, 20 wt % or less, 15 wt % or less, 10 wt % or less, 5 wt % or less, or about 0 wt %, and may be in the range of 0 to 40 wt %, e.g., 0 to 30 wt %, 0 to 20 wt %, or 5 to 15 wt %. Examples of high solids alkyd resins are described, e.g., in U.S. Pat. Nos. 5,158,608; 5,055,548; 5,053,483; 4,997,480 and 4,025,475, which are incorporated herein by reference.

Additive Compositions

Also provided herein are compositions that contain an anti-skinning agent, e.g. an anti-skinning agent of formula (I), (II) or (III), as described above, and a drier. In certain embodiments, the subject compositions containing the subject anti-skinning agent and a drier are additives for alkyd resin-based coating compositions, as described above, e.g., additives for alkyd paint or finish. In certain embodiments, the drier includes an organometallic salt, such as a metal carboxylate, as described above. In certain embodiments, the drier is complexed with a complexing agent, as described above.

The amount of anti-skinning agent and drier that may be present in the subject additive composition may vary depending on the final amount of anti-skinning agent and drier desired when the additive composition is combined with an alkyd resin coating composition of interest. In certain embodiments, the anti-skinning agent may be present in the subject additive composition at 0.01 wt % or greater, e.g., 0.1 wt % or greater, 1 wt % or greater, 5 wt % or greater, 10 wt % or greater, 20 wt % or greater, including 50 wt % or greater, and may be present at 60 wt % or less, e.g., 50 wt % or less, 30 wt % or less, 10 wt % or less, 1 wt % or less, including 0.1 wt % or less. In certain embodiments, the anti-skinning agent may be present in the subject additive composition in a range of 0.01 to 60 wt %, e.g., 0.1 to 50 wt %, 1 to 20 wt %, including 5 to 15 wt %. In certain embodiments, the drier may be present in the subject additive composition at 0.01 wt % or greater, e.g., 0.1 wt % or greater, 1 wt % or greater, 5 wt % or greater, 10 wt % or greater, 20 wt % or greater, including 50 wt % or greater, and may be present at 60 wt % or less, e.g., 50 wt % or less, 30 wt % or less, 10 wt % or less, 1 wt % or less, including 0.1 wt % or less. In certain embodiments, the anti-skinning agent may be present in the subject additive composition in a range of 0.01 to 60 wt %, e.g., 0.1 to 30 wt %, 1 to 20 wt %, including 1 to 10 wt %.

In certain embodiments, the drier may be present in the subject additive composition at 0.001 wt % or greater, e.g., 0.01 wt % or greater, 0.1 wt % or greater, 1 wt % or greater, 5 wt % or greater, including at 10 wt % or greater, and may be present in the composition at 20 wt % or less, e.g., 15 wt % or less, 10 wt % or less, 5 wt % or less, 1 wt % or less, 0.5 wt % or less, 0.1 wt % or less, 0.05 wt % or less, including 0.01 wt % or less. In certain embodiments, the drier may be present in the subject additive composition in a range of 0.001 to 20 wt %, e.g., 0.01 to 17 wt %, 0.1 to 15 wt %, including a range of 1 to 15 wt %.

The subject composition containing the subject anti-skinning agent and a drier may further include a solvent. The solvent may be a volatile or non-volatile organic solvent. Suitable organic solvents include hydrocarbon, ester, ketone, ether, ether-ester, alcohol, or ether-alcohol type solvents used individually or in mixtures, as described above. In certain embodiment, the solvent is a non-volatile solvent, e.g., for use in low VOC alkyd-based resins. Suitable non-volatile solvent include methyl esters of natural oils, such as methyl soyate derived from soy oil.

Container Holding a Coating Composition

Further aspects of the present disclosure include a container that contains the subject coating composition, e.g., a container that holds an alkyd resin coating composition containing an anti-skinning agent of formula (I), (II) or (III), as described above. The container may be a flexible container or a rigid container. The container may be an air-tight container, re-sealable water-tight/air-tight container, water-impermeable plastics material (e.g., polyvinylchloride), etc. In certain embodiments, the container is made of a metal alloy, such as a tin alloy or steel, is made of plastic, or a combination there of.

Methods

Method of Preparing a Coating Composition Containing an Anti-Skinning Agent

Further aspects of the present disclosure include methods for preparing an alkyd resin coating composition containing an anti-skinning agent. Thus, in certain embodiments, the method includes combining an alkyd resin and an anti-skinning composition that includes an anti-skinning agent of formula (I), (II), or (III), as described above, under conditions sufficient to produce a coating composition. In some embodiments, the anti-skinning agent is incorporated into the alkyd resin directly. In other embodiments, the anti-skinning agent is first combined with a drier to produce an additive composition, e.g., an anti-skinning composition, and the additive composition, e.g., anti-skinning composition, is subsequently incorporated into the alkyd resin.

The amount of anti-skinning agent added to the alkyd resin coating composition may vary depending on the type of coating composition, and may be 0.0001 wt % or greater, e.g., 0.001 wt % or greater, 0.001 wt % or greater, 0.01 wt % or greater, 0.1 wt % or greater, 1 wt % or greater, 1.5 wt % or greater, 2 wt % or greater, 2.5 wt % or greater, 3 wt % or greater, 3.5 wt % or greater, 4 wt % or greater, 4.5 wt % or greater, including in an amount of about 5 wt % or greater, and may be 4 wt % or less, e.g., 3 wt % or less, 2.5 wt % or less, 2 wt % or less, 1.5 wt % or less, 1 wt % or less, 0.5 wt % or less, 0.1 wt % or less, 0.05 wt % or less, 0.01 wt % or less, 0.005 wt % or less, and including in an amount of 0.001 wt % or less. In certain embodiments, the anti-skinning agent is added to the alkyd resin coating composition in an amount ranging from 0.0001 wt % to 5 wt %, e.g., 0.001 wt % to 5 wt %, 0.005 wt % to 4.5 wt %, 0.01 wt % to 4%, 0.05 wt % to 3.5 wt %, including 0.1 wt % to 3 wt %.

The anti-skinning composition may be combined with the alkyd resin by any convenient mixing protocol so long as the anti-skinning agent and alkyd resin are sufficiently incorporated together, such as, but not limited to, by planetary mixers, Patterson-Kelley blender, hand mixers, standup mixers, inline mixers, powder liquid mixers, batch mixers, kneaders, agitator drives, impellers, hydrofoil mixers, aerators, among other mixing protocols. For example, the anti-skinning composition and alkyd resin may be mixed for 1 minute or more, such as for 2 minutes or more, such as for 5 minutes or more, such as for 10 minutes or more, such as for 30 minutes or more, such as for 60 minutes or more and including mixing for such as from 120 minutes or more. The anti-skinning composition and alkyd resin may be at any suitable temperature when combined together, so long as the temperature does not degrade or negatively affect the subject compositions. In embodiments, the anti-skinning composition and alkyd resin may be at a temperature ranging from −50° C. to 250° C., such as from −25° C. to 200° C., such as from 0° C. to 150° C., such as from 10° C. to 100° C. and including from 15° C. to 85° C. If desired, the temperature may be modified at any time. In some instances, the temperature is not changed. In other embodiments, the temperature may be increased or decreased. For example, the temperature may be increased or decreased by 0.01° C. or more, such as 0.05° C. or more, such as 0.1° C. or more, such as 0.5° C. or more, such as 1° C. or more, such as 5° C. or more, such as 10° C. or more, such as 15° C. or more, such as 20° C. or more, such as 25° C. or more, including by 50° C. or more.

As discussed above, the subject coating compositions may further include a drier, such as a metal carboxylate, a complexing agent, and one or more additional excipients, including but not limited to, colorants, pigment, anti-corrosives, extenders, stabilizers, dye, surfactants, emulsifiers, anti-oxidants, plasticizers, surface-controlling agents, anti-silking agents, defoaming agents, rheological controlling agents, active metal carbonates, nitrogen-containing ligands, binders, fillers, anti-reflective agents, diluents, and toughening agents as well as ultraviolet absorbers.

In some embodiments, all of the components are added to the mixer simultaneously. In other embodiments, each component may be added to the mixer sequentially. One or more components may be mixed concurrently while being added to the mixer or all of the components are first added to the mixer and then the entire composition of interest (e.g., paint, varnish, wood stain) is mixed. In certain embodiments, the drier and the complexing agent are mixed together before adding the complexed drier to the alkyd resin.

Method of Forming a Coat on a Surface

Also provided herein are methods of forming a coat on a surface of a solid support by applying to a surface of a solid support the subject alkyd resin coating composition containing an anti-skinning agent of formula (I), (II), or (III), as described above, thereby forming a coat on the surface of the solid support. By "applying" is meant contacting one or more of the subject coating compositions onto a surface, such as for example, onto the surface of a solid support. As such, applying may include depositing or otherwise positioning one or more of the subject compositions on a surface. In certain embodiments, applying includes depositing a thin layer of the subject coating compositions onto a surface, such as layer having a thickness of 1 nm or more, such as 2 nm or more, such as 5 nm or more, such as 10 nm or more, such as 25 nm or more, such as 50 nm or more and including 100 nm or more. In embodiments, the subject coating composition may be applied over the entire support surface or a part of the support surface, as desired. In some embodiments, applying includes depositing the subjection coating composition onto less than the entire surface of the support. For instance, applying may include depositing onto 50% or less of the entire surface of the support, such as 45% or less, such as 40% or less, such as 35% or less, such as 30% or less and including 25% or less of the entire surface of the support. In certain instances, applying includes depositing the subject composition to specific locations on the support surface. For example, depositing to specific locations may include depositing onto the support surface in the form of spots (or any other geometric shape) or strips (e.g., straight or non-straight having regular and irregular patterns).

In embodiments, supports of interest may be flat, curved, smooth, rough, porous, non-porous, or any combination thereof. In some instances, supports include, but are not limited to, wood (e.g., floors, walls, carvings, etc.), synthetic polymers (e.g., plastic sheeting, wall covers, containers, etc.), metals (e.g., automobile body panels, boat hulls, etc.), fabric (e.g., canvas, denim, etc.), ceramic (e.g., pottery, fiberglass, etc.), composites (e.g., reinforced carbon fibers, etc.) as well as combinations thereof.

The thickness of the layer of composition applied to the surface of the support will depend on the desired properties, the rate of application, the number of layers applied and the duration of application. One or more layers of the subject coating compositions may be applied to the support surface. For example, two or more layers may be applied to the support surface, such as three or more layers, such as four or more layers, including 5 or more layers of the subject coating composition may be applied to the support surface. As described in greater detail below, additional layers of the subject coating compositions may be added if necessary, such as for example to improve smoothness and uniformity of the completed surface coating. For example, if after evaluating the deposited coating composition (by methods as described below), it is determined that the composition applied to the surface of the support is less than optimal or is unsuitable, additional coating layers may be applied to all or part of the deposited coating.

The thickness of the coating composition applied to the surface of the support may vary, such as 0.1 µm or more, such as 0.5 µm or more, such as 1.0 µm or more, such as 1.5 µm or more, such as 2.0 µm or more, such as µm or more, such as 10 µm or more, including 100 µm or more. For example, the composition applied to the surface of the support may have a thickness which ranges from 0.1 µm to 250 µm, such as from 0.5 µm to 200 µm, such as from 1 µm to 150 µm, such as from 5 µm to 100 µm, such as from 10 µm to 90 µm and including from 25 µm to 75 µm. In certain embodiments, the composition applied to the surface of the support has a thickness of 50 µm.

The subject coating compositions may be applied by any convenient protocol, such as for example by brushing, rolling, spraying, spin coating, dip coating, mist coating, among other protocols. Depending on the protocol used to apply the subject composition to the support surface, each coating layer may be applied over a duration of 0.5 hours or longer, such as 1 hour or longer, such as 2 hours or longer, such as 5 hours or longer, such as 10 hours or longer, such as 30 hours or longer, including 60 hours or longer. For example, each coating layer may be applied over the course of from 0.1 hours to 100 hours, such as from 0.5 hours to 96 hours, such as from 0.1 hours to 84 hours, such as from 0.5 hours to 72 hours, such as from 1 hour to 60 hours, such as from 2 hours to 48 hours, such as from 3 hours to 36 hours and including over the course of from 6 hours to 24 hours.

Coating compositions of interest may be applied to form a coating on a support surface at temperatures which vary, depending on the proportion of alkyd resin as well as other additives, when present as described above. In embodiments, methods include applying to the surface of the support a composition having a alkyd resin and an antiskinning agent at a temperature ranging such as from −50° C. to 250° C., such as from −25° C. to 200° C., such as from 0° C. to 150° C., such as from 10° C. to 100° C. and including from 15° C. to 85° C. In certain embodiments, the subject coating compositions are applied to a surface at ambient room temperature. If desired, the temperature may be modified at any time. In some instances, the temperature is not changed and remains the same throughout the entire time the composition is applied to the support surface. In other embodiments, the temperature may be increased or decreased. For example, the temperature may be increased or decreased by 0.01° C. or more, such as 0.05° C. or more, such as 0.1° C. or more, such as 0.5° C. or more, such as 1° C. or more, such as 5° C. or more, such as 10° C. or more, such as 15° C. or more, such as 20° C. or more, such as 25° C. or more, including by 50° C. or more.

After coating compositions are applied to the support, methods may also include subjecting the applied coating to conditions sufficient to dry the coating on the substrate. In some embodiments, drying the composition applied to the surface of the support includes subjecting the composition to conditions sufficient to crosslink the crosslinkable polymer precursor in the alkyd resin. As discussed above, any desired amount of the crosslinkable polymer precursor may be crosslinked to dry the coating on the support, such as crosslinking 5% or more of the crosslinkable polymer precursor, such as 10% or more, such as 25% or more, such as 50% or more, such as 75% or more, such as 90% or more, such as 95% or more and including crosslinking 99% or more of the crosslinkable polymer precursor in the alkyd resin.

The amount of time required to dry (e.g., crosslink the crosslinkable polymer precursor) the applied coating may vary depending on the amount of drying agent present, type of alkyd resin and other additives present, as discussed above. In embodiments, the composition applied to the surface of the support forms a dry coating on the support in 72 hours or less, such as 60 hours or less, such as 48 hours or less, such as 36 hours or less, such as 24 hours or less, such as 18 hours or less, such as 12 hours or less, such as 6 hours or less and including drying in 3 hours or less. For example, the composition applied to the surface of the support may form a dry coating on the support in a duration which ranges from 1 hour to 72 hours, such as from 2 hours to 60 hours, such as from 3 hours to 48 hours, such as from 6 hours to 36 hours, such as from 12 hours to 30 hours and including from 18 hours and 24 hours. In certain embodiments, the coating composition applied to the surface of the support forms a dry coating on the support in 24 hours or less.

In certain embodiments, the coating composition applied to the surface of the support is subjected to conditions sufficient to produce a hard coating on the surface of the support By "hard" is meant that the coating has a solid consistency where the coating formed on the support surface may be flexible, pliable or rigid. The term "flexible" is used in its conventional sense to mean that the coating is capable of being bent without breaking or otherwise able to be turned, bowed, or twisted, without breaking. In these embodiments, the coating may be pliable and is not rigid or stiff. In other embodiments, the coating formed on the support surface is rigid. The term "rigid" is used in its conventional sense to mean that the coating is stiff and not capable of substantially being bent without cracking or breaking.

In some embodiments, the coating composition applied to the surface of the support is subjected to conditions sufficient to produce a coating on the surface of the support having a durometer hardness which ranges from 10 Shore OO to 100 Shore OO, such as 20 Shore 00 to 90 Shore OO, such as 30 Shore OO to 80 Shore OO and including 40 Shore OO to 70 Shore OO. In other embodiments, the composition applied to the surface of the support is subjected to conditions sufficient to produce a coating on the surface of the support having a durometer hardness which ranges from 10 Shore A to 100 Shore A, such as 20 Shore A to 90 Shore A, such as 30 Shore A to 80 Shore A and including 40 Shore A to 70 Shore A.

In some instances, drying the coating composition applied to the surface of the support includes air-drying. Air-drying, according to certain embodiments, includes exposing the subject coating composition to a gaseous composition having one or more gaseous components, such as two or more gaseous components, such as three or more, such as four or more, such as five or more and including ten or more gaseous components. For example, air-drying may include contacting the subject coating compositions having an alkyd resin with a gaseous composition containing one or more of oxygen, nitrogen, helium, hydrogen, argon, xenon, carbon dioxide, carbon monoxide, among other gases. In some embodiments, air-drying includes contacting with an oxygen gas. In other embodiments, air-drying includes contacting with atmospheric air. Air-drying may also include contacting the subject coating compositions having an alkyd resin with a gaseous composition under modified pressure conditions. For example, in some instances the subject coating compositions are contacted with the gaseous composition under increased pressure relative to atmospheric pressure, such as under a pressure of 0.001 kPa or more above atmospheric pressure, such as 0.005 kPa or more, such as 0.01 kPa or more, such as 0.05 kPa or more, such as 0.1 kPa or more, such as 0.5 kPa or more, such as 1 kPa or more, such as 2.5 kPa or more, such as 5 kPa or more, such as 10 kPa or more and including under a pressure of 25 kPa or more above atmospheric pressure. In other instances, the subject coating compositions are contacted with the gaseous composition under reduced pressure relative to atmospheric pressure, such as under a pressure of 0.001 kPa or below atmospheric pressure, such as 0.005 kPa or more, such as 0.01 kPa or more, such as 0.05 kPa or more, such as 0.1 kPa or more, such as 0.5 kPa or more, such as 1 kPa or more, such as 2.5 kPa or more, such as 5 kPa or more, such as 10 kPa or more and including under a pressure of 25 kPa or more below atmospheric pressure.

Air-drying may also include contacting the coating composition applied to the surface of the support with a gaseous composition under modified temperature. For example, in some instances the coating composition applied to the surface of the support is contacted with the gaseous composition under an elevated temperature relative to room temperature, such as under a temperature of 1° C. or more above room temperature, such as 2° C. or more, such as 5° C. or more, such as 10° C. or more, such as 15° C. or more, such as 20° C. or more, such as 25° C. or more, such as 30° C. or more, such as 35° C. or more, such as 40° C. or more and including under an elevated temperature of 50° C. or more above room temperature. In other instances, the composition applied to the surface of the support is contacted with the gaseous composition under a reduced temperature relative to room temperature, such as under a temperature of 1° C. or more below room temperature, such as 2° C. or more, such as 5° C. or more, such as 10° C. or more, such as 15° C. or more, such as 20° C. or more, such as 25° C. or more, such as 30° C. or more, such as 35° C. or more, such as 40° C. or more and including under a reduced temperature of 50° C. or more below room temperature.

In certain instances, methods include conditioning the surface of the support prior to applying the subject coating composition, i.e., the support surface is conditioned prior to application. By "conditioned" is meant that the support is prepared for deposition of the coating composition. In certain instances, the support is subjected to a process which prepares the support to be more receptive to the applied composition of interest. By "more receptive" is meant that conditioning process improves the deposition (e.g. adhesion, surface smoothness, etc.) of the subject coating composition to the support surface. In one example, the conditioning process increases the surface area of the support, such as by roughening the support by sanding the surface. For instance, roughening the surface may increase the surface area of the support by 5% or more, such as by 10% or more, such as by 15% or more, such as by 25% or more, such as by 35% or more, such as by 40% or more and including increasing the surface area of the support by 50% or more. In other instances, the conditioning process increases the adhesion of the subject compositions to the support surface. For example, the conditioning process increases the adhesion of the subject coating composition to the support surface by 2 times or more, such as 3 times or more, such as 5 times or more, including 10 times or more.

In some embodiments, more than one layer of the subject coating composition is applied to the support. For example, two or more coating layers of the subject composition may be applied, such as three or more coating layers and including five or more coating layers. In some embodiments, each subsequent coating layer is applied after a predetermined period after deposition of the previous coating layer. For example, each subsequent layer may be applied, 1 hour or more after the previous coating layer is applied, such as 2 hours or more, such as 5 hours or more, such as 10 hours or more, such as 60 hours or more and including 96 hours or more after the previous layer is deposited.

In certain embodiments, a subsequent coating layer is applied on top of the previous coating layer immediately after applying the coating layer to the support. By "immediately" is meant that the subsequent coating layer is applied as soon as deposition of the previous coating layer is complete. In some instances, application of a subsequent coating layer may even commence for a short predetermined period of time prior to completion of deposition of the previous coating layer resulting in a multicomponent layer (composed of both the first coating layer material and second coating layer material) formed between the first coating layer and second coating layer.

Methods for forming a coat on a surface of a support may also include monitoring the coating composition applied to the surface of the support. By "monitoring" is meant that one or more properties of the coating layers are determined and assessed in conjunction with or after application. In some embodiments, methods include determining the physical makeup of the composition applied to the surface of the support. Determining the physical makeup refers to the analysis of one or more physical parameters of the coating composition applied to the surface of the support. For example, the amount of material deposited, thickness, smoothness, uniformity of each layer and wettability may be assessed. Any convenient protocol can be employed to determine the physical makeup of the composition applied to the surface of the support. Methods for analyzing the physical makeup of the coating composition applied to the surface of the support include, but are not limited to quartz crystal microbalance, visible microscopy, electron microscopy, surface reflection analysis, contact angle studies, among others. In other embodiments, methods include determining the chemical makeup of the coating composition applied to the surface of the support. Determining the chemical makeup refers to the analysis of one or more of the chemical properties the composition applied to the surface of the support, such as for example monitoring the extent of crosslinking of the applied composition. Determining the makeup of the coating composition applied to the surface of the support may also include, but is not limited to determining the metal composition, amount of impurities as well as spectroscopic properties. Any convenient protocol can be employed to determine the makeup of the composition applied to the surface of the support. Methods for analyzing the makeup of the composition applied to the surface of the support include, but are not limited to IR spectroscopy, UV-vis spectrophotometry, visible microscopy, as well as electron microscopy.

The coating composition applied to the surface of the support may be monitored at any phase during the subject methods. For example, the makeup of the coating composition applied to the surface of the support may be determined immediately after application. In other embodiments, the makeup of the composition applied to the surface of the support is determined throughout the application process. For instance, data (i.e., thickness, conductivity, impurity content, etc.) about the coating composition applied to the surface of the support may be monitored throughout the deposition process, such by real-time data collection. In other embodiments, the coating composition applied to the surface of the support may be monitored during the application process by collecting data at regular intervals, e.g., collecting data every 1 minute, every 5 minutes, every 10 minutes, every 30 minutes, every 60 minutes, every 100 minutes, every 200 minutes, every 500 minutes, or some other interval.

Methods of the present disclosure also include assessing the collected data. By "assessing" the collected data is meant that a human (either alone or with the assistance of a computer, if using a computer automated process initially set up under human direction), evaluates the collected data about the coating composition applied to the surface of the support and determines whether the each layer is suitable or unsuitable. For example, if after assessing that the coating composition applied to the surface of the support is suitable, no further adjustments may be made. In other words, methods of these embodiments include a step of assessing the collected data to identify any desired adjustments to the composition applied to the surface of the support. The desired adjustments may vary in terms of goal, where in some instances the desired adjustments that ultimately result in enhanced efficiency of some desirable parameter, e.g., smoothness, uniformity and thickness. In some instances, where the coating composition applied to the surface of the support has been determined to be at least less than optimal, that coating may be further processed. If necessary, the coating composition applied to the surface of the support may be further processed at more than one times during methods of the present disclosure, such as two or more times, such as three or more times, such as four or more times and including five or more times.

In certain embodiments, processing may include adjusting the thickness of the coating composition applied to the surface of the support. For instance, processing the coating composition applied to the surface of the support may include increasing the thickness of the applied coating layer, such as by 0.1 nm or more, such as 0.5 nm or more, such as 1.0 nm or more, such as 1.5 nm or more, such as 2.0 nm or more, such as 5 nm or more, including 10 nm or more. The thickness of part or all of each coating layer maybe adjusted. For example, in some embodiments, methods include increasing the thickness of the entire applied coating layer. In other embodiments, less than that entire applied coating layer may be increased in thickness, such as 95% or less of the deposited layer is increased in thickness, such as 75% or less, such as 50% or less, such as 25% or less, such as 10% or less, and including 5% or less of the coating composition applied to the surface of the support is increased in overall thickness. In certain instances, specific regions on the composition applied to the surface of the support may be adjusted, resulting in discrete portions of the applied coating layer having varying thickness.

In other embodiments, processing may include adjusting the smoothness of the coating composition applied to the surface of the support. For instance, processing may include improving the smoothness of the coating composition applied to the surface of the support. All or a portion of the applied coating layer may be processed to improve the smoothness of the coating composition applied to the surface of the support. For example, in some embodiments, methods include improving the smoothness of the entire applied coating layer. In other embodiments, less than that entire applied coating layer may be process to improve smoothness, such as 95% or less, such as 75% or less, such as 50% or less, such as 25% or less, such as 10% or less, and including 5% or less of the coating composition applied to the surface of the support is processed to improve smoothness. In some instances, specific positions on the applied coating layer may be targeted for improving smoothness.

Utility

The subject anti-skinning agents, compositions containing the same, and methods of the present disclosure find use in a number of different applications where it is desirable to obtain a coating composition with an improved response to storage conditions, i.e., a slower rate of skin formation on the air-exposed surface of the composition. In certain embodiments, the improved response to storage conditions is achieved without substantially affecting other desirable properties of the coating composition, such as fast drying time, sufficient hardness, minimum color changes and strong adhesion to a support.

The present disclosure finds use in applications where it is desirable to reduce the use of volatile, toxic anti-skinning compounds, such as oxime-based anti-skinning compounds. In certain embodiments where the anti-skinning compound is present in a low volatile organic compound (VOC) alkyd resin, the use of toxic VOCs is reduced.

Kits

Also provided herein are kits that include one or more of the subject compositions containing the anti-skinning agents that include a compound of formula (I), (II), or (III), as described above. In certain embodiments, the subject compositions in the kits may be provided in a package or container. Some components of the kit may be provided separately in individual containers, and/or at least some components of the kit may be provided combined in a common container.

In some embodiments, kits may include a separate amount of each component of the subject compositions (e.g., alkyd resin, anti-skinning agent, drier, complexing agent, colorants, pigment, anti-corrosives, extenders, stabilizers, dye, surfactants, emulsifiers, plasticizers, surface-controlling agents, anti-silking agents, defoaming agents, rheological controlling agents, active metal carbonates, nitrogen-containing ligands, binders, fillers, anti-reflective agents, diluents, toughening agents, ultraviolet absorbers, etc.) where the user can mix each component separately in proportions desired, prior to application. In these embodiments, kits may further include one or more containers for mixing the subject compositions as well as a measuring device for portioning out each component, as desired.

In certain instances, kits of interest include an amount of an alkyd resin, anti-skinning agent that includes a compound of formula (I), (II), or (III), as described above, and other components which make up a paint (e.g., colorants, extenders, binders, etc.). In such instances, the kit may further include a drier, e.g., a metal carboxylate. In some instances, the drier may be complexed with a complexing agent, e.g., a chelating agent. In other instances, kits of interest include an amount of an alkyd resin, anti-skinning agent and other components which make up a varnish. In such instances, the kit may further include a drier, e.g., a metal carboxylate. In some instances, the drier may be complexed with a complexing agent, e.g., a chelating agent. In other instances, kits of interest include an amount of an alkyd resin, anti-skinning agent and other components which make up a wood polish. In such instances, the kit may further include a drier, e.g., a metal carboxylate. In some instances, the drier may be complexed with a complexing agent, e.g., a chelating agent.

In certain instances, the kit includes an amount of an anti-skinning agent that includes a compound of formula (I), (II), or (III), as described above, and a drier, e.g., metal carboxylate. In such instances, the kit may further include a complexing agent, e.g., a chelating agent. In some instances, the drier may be complexed with the complexing agent.

Kits may further include components for practicing the subject methods, such as devices for applying the subject coating compositions to a support surface (e.g., sprayers or applicators), cartridges having a loaded predetermined amount of the subject coating compositions, measuring cups or devices for portioning desired amounts for application.

In addition, kits may also include instructions for how to use the subject compositions, where the instructions may include information about to how to apply the coating compositions to a support surface, and/or may include information about to how to add the additive composition to a coating composition. The instructions are recorded on a suitable recording medium. For example, the instructions may be printed on a substrate, such as paper or plastic, etc. As such, the instructions may be present in the kits as a package insert, in the labeling of the container of the kit or components thereof (i.e. associated with the packaging or sub-packaging) etc. In other embodiments, the instructions are present as an electronic storage data file present on a suitable computer readable storage medium, e.g., portable flash drive, CD-ROM, diskette, etc. In yet other embodiments, the actual instructions are not present in the kit, but means for obtaining the instructions from a remote source, e.g. via the internet, are provided. An example of this embodiment is a kit that includes a web address where the instructions can be viewed and/or from which the instructions can be downloaded. As with the instructions, the protocol for obtaining the instructions may be recorded on a suitable substrate.

Notwithstanding the appended clauses, the disclosure is also defined by the following clauses:

1. A coating composition comprising:
an alkyd resin; and
an oxime-free anti-skinning agent.

2. The coating composition according to Clause 1, wherein the oxime-free anti-skinning agent is a urea compound.

3. The coating composition according to Clause 2, wherein the urea compound is described by the formula (I):

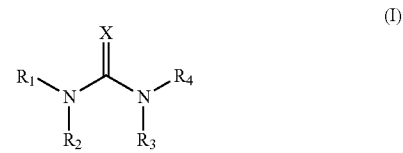

wherein:
X is independently selected from oxygen and sulfur;
$R_1$-$R_4$ are independently selected from hydrogen, halo, $C_1$-$C_{24}$ alkyl, $C_2$-$C_{24}$ alkenyl, $C_2$-$C_{24}$ alkynyl, $C_5$-$C_{20}$ aryl, $C_6$-$C_{24}$ alkaryl, $C_6$-$C_{24}$ aralkyl, hydroxyl, $C_1$-$C_{24}$ alkoxy, $C_2$-$C_{24}$ alkenyloxy, $C_2$-$C_{24}$ alkynyloxy, $C_5$-$C_{20}$ aryloxy, acyloxy, acyl, $C_2$-$C_{24}$ alkoxycarbonyl, $C_6$-$C_{20}$ aryloxycarbonyl, $C_2$-$C_{24}$ alkylcarbonyl, $C_6$-$C_{20}$ arylcarbonyl, halocarbonyl, formyl, thioformyl, $C_2$-$C_{24}$ alkylcarbonato, $C_6$-$C_{20}$ arylcarbonato, carboxy, carboxylato, carbamoyl, thiocarbamoyl, carbamato, carbamido, cyano, isocyano, cyanato, isocyanato, isothiocyanato, amino, $C_2$-$C_{24}$ alkylamido, $C_6$-$C_{20}$ arylamido, imino, alkylimino, arylimino, nitro, nitroso, sulfhydryl, $C_1$-$C_{24}$ alkylsulfanyl, $C_5$-$C_{20}$ arylsulfanyl, sulfo, sulfino, sulfonyl, phosphino, phosphono, and O-phosphono, any of which may be unsubstituted or substituted and may contain one or more heteroatoms, and wherein any two adjacent groups selected from $R_1$-$R_4$ may be taken together to form a cycle, wherein such cycle may be aliphatic, aromatic, heteroatom-containing, substituted, or a combination thereof.

4. The coating composition according to Clause 3, wherein $R_1$-$R_4$ are independently selected from $C_1$-$C_{24}$ alkyl.

5. The coating composition according to Clause 4, wherein $R_1$-$R_4$ are independently selected from $C_1$-$C_4$ alkyl.

6. The coating composition according to Clause 5, wherein $R_1$-$R_4$ are independently selected from methyl and ethyl.

7. The coating composition according to Clause 6, wherein $R_1$-$R_4$ are methyl.

8. The coating composition according to Clause 3, wherein X is sulfur.

9. The coating composition according to Clause 6, wherein the anti-skinning agent comprises thiourea or a derivative thereof.

10. The coating composition according to Clause 1, wherein the anti-skinning agent comprises a compound selected from the group consisting of urea, thiourea, 1,1,3,3-tetramethylurea and 1,1,3,3-tetramethylthiourea.

11. The coating composition according to any of the preceding clauses, wherein the anti-skinning agent is present in the composition in an amount ranging from 0.0001 wt % to 10 wt %.

12. The coating composition according to any of the preceding clauses, wherein the coating composition comprises a drier.

13. The coating composition according to Clause 12, wherein the drier comprises a metal carboxylate.

14. The coating composition according to Clause 13, wherein the metal carboxylate comprises a metal selected from the group consisting of Lithium, Sodium, Potassium, Magnesium, Calcium, Strontium, Barium, Titanium, Zirconium, Cerium, Vanadium, Neodymium, Manganese, Rhenium, Iron, Ruthenium, Cobalt, Rhodium, Nickel, Palladium, Platinum, Copper, Silver, Gold, Zinc, Aluminium, Tin, Lead, and Bismuth.

15. The coating composition according to any of Clauses 12 to 14, wherein the drier is complexed with a complexing agent.

16. The coating composition according to Clause 15, wherein the complexing agent comprises a compound comprising nitrogen, oxygen, phosphorous, sulfur, or a combination thereof.

17. The coating composition according to Clause 15, wherein the complexing agent comprises a chelating agent.

18. The coating composition according to Clause 17, wherein the chelating agent is selected from the group consisting of 1,10-phenanthroline and 2,2'-bipyridyl.

19. A container comprising a coating composition according to any of the preceding clauses.

20. A method of forming a coat on a surface of a solid support, the method comprising applying to a surface of a solid support the coating composition according to any of Clauses 1 to 18, thereby forming a coat on the surface of the solid support.

21. A composition comprising:
an oxime-free anti-skinning agent; and
a drier.

22. The composition according to Clause 21, wherein the oxime-free anti-skinning agent is a urea compound.

23. The composition according to Clause 22, wherein the urea compound is described by the formula (I):

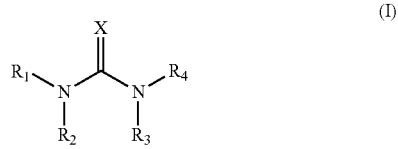

(I)

wherein:
X is independently selected from oxygen and sulfur;
$R_1$-$R_4$ are independently selected from hydrogen, halo, $C_1$-$C_{24}$ alkyl, $C_2$-$C_{24}$ alkenyl, $C_2$-$C_{24}$ alkynyl, $C_5$-$C_{20}$ aryl, $C_6$-$C_{24}$ alkaryl, $C_6$-$C_{24}$ aralkyl, hydroxyl, $C_1$-$C_{24}$ alkoxy, $C_2$-$C_{24}$ alkenyloxy, $C_2$-$C_{24}$ alkynyloxy, $C_5$-$C_{20}$ aryloxy, acyloxy, acyl, $C_2$-$C_{24}$ alkoxycarbonyl, $C_6$-$C_{20}$ aryloxycarbonyl, $C_2$-$C_{24}$ alkylcarbonyl, $C_6$-$C_{20}$ arylcarbonyl, halocarbonyl, formyl, thioformyl, $C_2$-$C_{24}$ alkylcarbonato, $C_6$-$C_{20}$ arylcarbonato, carboxy, carboxylato, carbamoyl, thiocarbamoyl, carbamato, carbamido, cyano, isocyano, cyanato, isocyanato, isothiocyanato, amino, $C_2$-$C_{24}$ alkylamido, $C_6$-$C_{20}$ arylamido, imino, alkylimino, arylimino, nitro, nitroso, sulfhydryl, $C_1$-$C_{24}$ alkylsulfanyl, $C_5$-$C_{20}$ arylsulfanyl, sulfo, sulfino, sulfonyl, phosphino, phosphono, and O-phosphono, any of which may be unsubstituted or substituted and may contain one or more heteroatoms, and
wherein any two adjacent groups selected from $R_1$-$R_4$ may be taken together to form a cycle, wherein such cycle may be aliphatic, aromatic, heteroatom-containing, substituted, or a combination thereof.

24. The composition according to Clause 23, wherein $R_1$-$R_4$ are independently selected from $C_1$-$C_{24}$ alkyl.

25. The composition according to Clause 24, wherein $R_1$-$R_4$ are independently selected from $C_1$-$C_4$ alkyl.

26. The composition according to Clause 25, wherein $R_1$-$R_4$ are independently selected from methyl and ethyl.

27. The composition according to Clause 26, wherein $R_1$-$R_4$ are methyl.

28. The composition according to any of Clauses 23 to 27, wherein X is sulfur.

29. The composition according to Clause 28, wherein the anti-skinning agent comprises thiourea or a derivative thereof.

30. The composition according to Clause 21, wherein the anti-skinning agent comprises a compound selected from the group consisting of urea, thiourea, 1,1,3,3-tetramethylurea and 1,1,3,3-tetramethylthiourea.

31. The composition according to any of Clauses 21 to 30, wherein the drier comprises a metal carboxylate.

32. The composition according to Clause 31, wherein the metal carboxylate comprises a metal selected from the group consisting of Lithium, Sodium, Potassium, Magnesium, Calcium, Strontium, Barium, Titanium, Zirconium, Cerium, Vanadium, Neodymium, Manganese, Rhenium, Iron, Ruthenium, Cobalt, Rhodium, Nickel, Palladium, Platinum, Copper, Silver, Gold, Zinc, Aluminium, Tin, Lead, and Bismuth.

33. The composition according to any of Clauses 21 to 32, wherein the drier is complexed with a complexing agent.

34. The composition according to Clause 33, wherein the complexing agent comprises a compound comprising nitrogen, oxygen, phosphorous, sulfur, or a combination thereof.

35. The composition according to Clause 33, wherein the complexing agent comprises a chelating agent.

36. The composition according to Clause 35, wherein the chelating agent is selected from the group consisting of 1,10-phenanthroline and 2,2'-bipyridyl.

37. A method of preparing a coating composition, the method comprising:
combining:
an alkyd resin; and
an oxime-free anti-skinning composition.

38. The method according to Clause 37, wherein the oxime-free anti-skinning composition comprises a urea compound.

39. The method according to Clause 38, wherein the urea compound is a compound described by the formula (I):

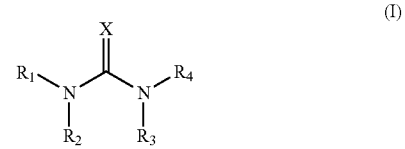

(I)

wherein:
X is independently selected from oxygen and sulfur;
$R_1$-$R_4$ are independently selected from hydrogen, halo, $C_1$-$C_{24}$ alkyl, $C_2$-$C_{24}$ alkenyl, $C_2$-$C_{24}$ alkynyl, $C_5$-$C_{20}$ aryl, $C_6$-$C_{24}$ alkaryl, $C_6$-$C_{24}$ aralkyl, hydroxyl, $C_1$-$C_{24}$ alkoxy, $C_2$-$C_{24}$ alkenyloxy, $C_2$-$C_{24}$ alkynyloxy, $C_5$-$C_{20}$ aryloxy, acyloxy, acyl, $C_2$-$C_{24}$ alkoxycarbonyl, $C_6$-$C_{20}$ aryloxycarbonyl, $C_2$-$C_{24}$ alkylcarbonyl, $C_6$-$C_{20}$ arylcarbonyl, halocarbonyl, formyl, thioformyl, $C_2$-$C_{24}$ alkylcarbonato, $C_6$-$C_{20}$ arylcarbonato, carboxy, carboxylato, carbamoyl, thiocarbamoyl, carbamato, carbamido, cyano, isocyano, cyanato, isocyanato, isothiocyanato, amino, $C_2$-$C_{24}$ alkylamido, $C_6$-$C_{20}$ arylamido, imino, alkylimino, arylimino, nitro, nitroso, sulfhydryl, $C_1$-$C_{24}$ alkylsulfanyl, $C_5$-$C_{20}$ arylsulfanyl, sulfo, sulfino, sulfonyl, phosphino, phosphono, and O-phosphono, any of which may be unsubstituted or substituted and may contain one or more heteroatoms, and wherein any two adjacent groups selected from $R_1$-$R_4$ may be taken together to form a cycle, wherein such cycle may be aliphatic, aromatic, heteroatom-containing, substituted, or a combination thereof, under conditions sufficient to produce a coating composition.

40. The method according to Clause 39, wherein $R_1$-$R_4$ are independently selected from $C_1$-$C_{24}$ alkyl.

41. The method according to Clause 40, wherein $R_1$-$R_4$ are independently selected from $C_1$-$C_4$ alkyl.

42. The method according to Clause 41, wherein $R_1$-$R_4$ are independently selected from methyl and ethyl.

43. The method according to Clause 42, wherein $R_1$-$R_4$ are methyl.

44. The method according to any of Clauses 39 to 43, wherein X is sulfur.

45. The method according to Clause 44, wherein the anti-skinning agent comprises thiourea or a derivative thereof.

46. The method according to Clause 37, wherein the anti-skinning agent comprises a compound selected from the group consisting of urea, thiouera, 1,1,3,3-tetramethylurea and 1,1,3,3-tetramethylthiourea.

47. The method according to any of Clauses 37 to 46, wherein the anti-skinning agent is combined with the coating composition by an amount ranging from 0.0001 wt % to 10 wt %.

48. The method according to any of Clauses 37 to 47, wherein the method comprises:

combining the anti-skinning agent and a drier, thereby forming an anti-skinning composition.

49. The method according to Clause 48, wherein the drier comprises a metal carboxylate.

50. The method according to Clause 49, wherein the metal carboxylate comprises a metal selected from the group consisting of Lithium, Sodium, Potassium, Magnesium, Calcium, Strontium, Barium, Titanium, Zirconium, Cerium, Vanadium, Neodymium, Manganese, Rhenium, Iron, Ruthenium, Cobalt, Rhodium, Nickel, Palladium, Platinum, Copper, Silver, Gold, Zinc, Aluminium, Tin, Lead, and Bismuth.

51. The method according to any of Clauses 48 to 50, wherein the method comprises combining the drier and a complexing agent.

52. The method according to Clause 51, wherein the complexing agent comprises a compound comprising nitrogen, oxygen, phosphorous, sulfur, or a combination thereof.

53. The method according to Clause 51, wherein the complexing agent comprises a chelating agent.

54. The method according to Clause 53, wherein the chelating agent is selected from the group consisting of 1,10-phenanthroline and 2,2'-bipyridyl.

Although the foregoing disclosure has been described in some detail by way of illustration and example for purposes of clarity of understanding, it is readily apparent to those of ordinary skill in the art in light of the teachings of this disclosure that certain changes and modifications may be made thereto without departing from the spirit or scope of the appended claims.

Accordingly, the preceding merely illustrates the principles of the disclosure. It will be appreciated that those skilled in the art will be able to devise various arrangements which, although not explicitly described or shown herein, embody the principles of the disclosure and are included within its spirit and scope. Furthermore, all examples and conditional language recited herein are principally intended to aid the reader in understanding the principles of the disclosure and the concepts contributed by the inventors to furthering the art, and are to be construed as being without limitation to such specifically recited examples and conditions. Moreover, all statements herein reciting principles, aspects, and embodiments of the disclosure as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present disclosure, therefore, is not intended to be limited to the exemplary embodiments shown and described herein. Rather, the scope and spirit of present disclosure is embodied by the appended claims.

What is claimed is:

1. A coating composition comprising:
an alkyd resin;
an oxime-free anti-skinning agent that is a urea compound described by formula (I):

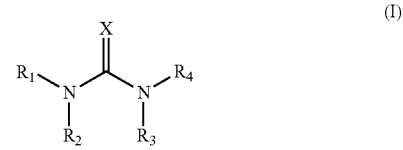

wherein:
X is independently selected from oxygen and sulfur; and
$R_1$-$R_4$ are each independently substituted or unsubstituted $C_1$-$C_{24}$ alkyl; and
a metal carboxylate drier;
wherein the coating composition has a volatile organic content (VOC) of 40 weight percent (wt %) or less.

2. The coating composition according to claim 1, wherein $R_1$-$R_4$ are independently selected from unsubstituted $C_1$-$C_{24}$ alkyl.

3. The coating composition according to claim 1, wherein $R_1$-$R_4$ are independently selected from $C_1$-$C_4$ alkyl.

4. The coating composition according to claim 3, wherein $R_1$-$R_4$ are independently selected from methyl and ethyl.

5. The coating composition according to claim 4, wherein $R_1$-$R_4$ are methyl.

6. The coating composition according to claim 1, wherein X is sulfur.

7. The coating composition according to claim 1, wherein X is oxygen.

8. The coating composition according to claim 1, wherein the anti-skinning agent comprises a compound selected from 1,1,3,3-tetramethylurea and 1,1,3,3-tetramethylthiourea.

9. The coating composition according to claim 1, wherein the anti-skinning agent is present in the composition in an amount ranging from 0.0001 wt % to 10 wt %.

10. The coating composition according to claim 1, wherein the metal carboxylate comprises a metal selected from the group consisting of Lithium, Sodium, Potassium, Magnesium, Calcium, Strontium, Barium, Titanium, Zirconium, Cerium, Vanadium, Neodymium, Manganese, Rhenium, Iron, Ruthenium, Cobalt, Rhodium, Nickel, Palladium, Platinum, Copper, Silver, Gold, Zinc, Aluminium, Tin, Lead, and Bismuth.

11. The coating composition according to claim 1, wherein the drier is complexed with a complexing agent.

12. The coating composition according to claim 11, wherein the complexing agent comprises a compound comprising nitrogen, oxygen, phosphorous, sulfur, or a combination thereof.

13. The coating composition according to claim 11, wherein the complexing agent comprises a chelating agent.

14. The coating composition according to claim 13, wherein the chelating agent is selected from the group consisting of 1,10-phenanthroline and 2,2'-bipyridyl.

15. A method of preparing a coating composition, the method comprising:
combining:
an alkyd resin;
an oxime-free anti-skinning composition that is a urea compound described by the formula (I):

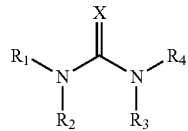

(I)

wherein:
X is independently selected from oxygen and sulfur; and
$R_1$-$R_4$ are each independently $C_1$-$C_{24}$ alkyl; and a metal carboxylate drier;
in a manner sufficient to produce a coating composition that has a volatile organic content (VOC) of 40 wt % or less.

16. The coating composition according to claim 1, wherein the coating has a volatile organic content (VOC) of 25 wt % or less.

17. The coating composition according to claim 1, wherein the coating composition has a volatile organic content (VOC) of 15 wt % or less.

18. A coating composition comprising:
an alkyd resin;
a metal carboxylate drier; and
an oxime-free anti-skinning agent that is a urea compound described by formula (I):

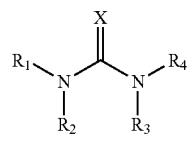

(I)

wherein:
X is oxygen; and
$R_1$-$R_4$ are each independently $C_1$-$C_4$ alkyl.

* * * * *